US008269180B2

(12) United States Patent  De Geronimo

(10) Patent No.: US 8,269,180 B2
(45) Date of Patent: Sep. 18, 2012

(54) METHOD AND APPARATUS FOR THE MEASUREMENT OF SIGNALS FROM RADIATION SENSORS

(75) Inventor: Gianluigi De Geronimo, Syosset, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 934 days.

(21) Appl. No.: 12/199,524

(22) Filed: Aug. 27, 2008

(65) Prior Publication Data

US 2010/0051818 A1    Mar. 4, 2010

(51) Int. Cl.
*G01T 1/24* (2006.01)
(52) U.S. Cl. .................................. 250/370.01
(58) Field of Classification Search .............. 250/370.01
See application file for complete search history.

(56) References Cited

U.S. PATENT DOCUMENTS

| 4,253,023 | A * | 2/1981 | Whited ..................... 250/370.12 |
| 7,271,395 | B2 * | 9/2007 | DeGeronimo ................ 250/382 |
| 7,531,808 | B1 * | 5/2009 | De Geronimo et al. ... 250/370.1 |

OTHER PUBLICATIONS

Kroeger et al., "Position Sensitive Germanium Detectors for the Advanced Compton Telescope," Sep. 1999, AIP Conference Proceedings pp. 1-5.*
De Geronimo, "Readout ASIC for 3D position-Sensitive detectors," Jun. 2008, IEEE transactions on Nuclear Science, vol. 55, No. 3, pp. 1593-1603.*

A. Owens and A. Peacock, "Compound Semiconductor Radiation Detectors," *Nuclear Instruments and Methods in Physics Research*, A531, pp. 18-37 (2004).
C.H. Malden and R.D. Speller, "A CdZnTe Array for the Detection of Explosives in Baggage by Energy-Dispersive X-Ray Diffraction Signatures at Multiple Scatter Angles," *Nuclear Instruments and Methods in Physics Research*, A449, pp. 408-415 (2000).
R. Arlt, J. Brutscher, R. Gunnink, V. Ivanov, K. Parnham, S.A. Soldner, J. Stein, "Use of CdZnTe Detectors in Hand-Held and Portable Isotope Identifiers to Detect Illicit Trafficking of Nuclear Material and Radioactive Sources," *IEEE NSS 2000 Conf. Record*, pp. 4/18-4/23 (2001).
T.H. Prettyman, K.D. Ianakiev, C.E. Moss, S.A. Soldner, M.R. Sweet and M.C. Browne, "Development of High Efficiency, Multi-Element CdZnTe Detectors for Portable Measurement Applications," *Journal of Radioanalytical and Nuclear Chemistry*, 248:2, pp. 295-300 (May 2001).
P.N. Luke, M. Amman, J.S. Lee, B.A. Ludewigt, and H. Yaver, "A CdZnTe Coplanar-Grid Detector Array for Environmental Remediation," *Nuclear Instruments and Methods in Physics Research*, A458, pp. 319-324 (2001).

(Continued)

*Primary Examiner* — Christine Sung
(74) *Attorney, Agent, or Firm* — Dorene M. Price

(57) ABSTRACT

The preferred embodiments of the present invention include a device for measuring an ionizing event in a radiation sensor. The device can include a charge amplifier and a timing shaper. The charge amplifier receives a cathode signal and is configured to output an amplified cathode signal. The timing shaper is operatively connected to the charge amplifier to receive the amplified cathode signal. The timing shaper is configured to generate a first pulse in response to a beginning of the ionizing event and a second pulse in response to an end of the ionizing event. The first and second pulses are associated with a depth of interaction of the ionizing event and are generated in response to a slope of the amplified cathode signal changing.

20 Claims, 9 Drawing Sheets

OTHER PUBLICATIONS

T.H. Prettyman, W.C. Feldman, K.R. Fuller, S.A. Storms, S.A. Soldner, C. Szeles, F.P. Ameduri, D.J. Lawrence, M.C. Browne, and C.E. Moss, "CdZnTe Gamma-Ray Spectrometer for Orbital Planetary Missions," *IEEE Transactions on Nuclear Science*, 49:4, pp. 1881-1886 (Aug. 2002).

O. Limousin, "New Trends in CdTe and CdZnTe Detectors for X- and Gamma-Ray Applications," *Nuclear Instruments and Methods in Physics Research*, A504, pp. 24-37 (2003).

L.J. Meng, Z. He, B. Alexander and J. Sandoval, "Spectroscopic Performance of Thick $HgI_2$ Detectors," *IEEE Transactions on Nuclear Science*, 53:3, pp. 1706-1712 (Jun. 2006).

Z. He and R.D. Vigil, "Investigation of Pixellated $HgI_2$ γ-ray Spectrometers," *Nuclear Instruments and Methods in Physics Research*, A492, pp. 387-401 (2002).

R. Redus, M. Squillante and J. Lund, "Electronics for High Resolution Spectroscopy with Compound Semiconductors," *Nuclear Instruments and Methods in Physics Research*, A380, pp. 312-317 (1996).

J.C. Lund, J.M. VanScyoc III, R.B. James, D.S. McGregor and R.W. Olsen, "Large Volume Room Temperature Gamma-Ray Spectrometers from $Cd_xZn_{1-x}Te$," *Nuclear Instruments and Methods in Physics Research*, A380, pp. 256-261 (1996).

M. Amman and P.N. Luke, "Optimization Criteria for Coplanar-Grid Detectors," *IEEE Transactions on Nuclear Science*, 46:3, pp. 205-212 (Jun. 1999).

A. Burger, K. Chattopadhyay, H. Chen, X. Ma, J.-O. Ndap, M. Schieber, T.E. Schlesigner, H.W. Yao, J. Erickson and R.B. James, "Defects in CZT Crystals and their Relationship to Gamma-Ray Detector Performance," *Nuclear Instruments and Methods in Physics Research*, A448, pp. 586-590 (2000).

F. Mathy, A. Glière, E. Gros d'Aillon, P. Massé, M. Picone, J. Tabary and L. Verger, "A Three-Dimensional Model of CdZnTe Gamma-Ray Detector and Its Experimental Validation," *IEEE Transactions on Nuclear Science*, 51:5 (Oct. 2004).

E. Gros d'Aillon, M.C. Gentet, G. Montémont, J. Rustique and L. Verger, "Simulation and Experimental Results on Monolithic CdZnTe Gamma-Ray Detectors," *IEEE Transactions on Nuclear Science*, 52:6, pp. 3096-3102 (Dec. 2005).

A. Shor, Y. Eisen and I. Mardor, "Gamma Spectroscopy with Pixelated CdZnTe Detectors," *IEEE Transactions on Nuclear Science*, 51:3, pp. 1204-1208 (Jun. 2004).

A.E. Bolotnikov, G.C. Camarda, G.W. Wright and R.B. James, "Factors Limiting the Performance of CdZnTe Detectors," *IEEE Transactions on Nuclear Science*, 52:3, pp. 589-598 (Jun. 2005).

D.S. Bale and C. Szeles, "Design of High Performance CdZnTe Quasi-Hemispherical Gamma-Ray CAPture™ Plus Detectors," *Proc. of SPIE*, vol. 6319 (2006).

Z. He, W. Li, G.F. Knoll, D.K. Wehe, J. Berry, C.M. Stahle, "3-D Position Sensitive CdZnTe Gamma-Ray Spectrometers," *Nuclear Instruments and Methods in Physics Research*, A442, pp. 173-178 (1999).

W. Li, Z. He, G.F. Knoll, D.K. Wehe and Y.F. Du, "A Modeling Method to Calibrate the Interaction Depth in 3-D Position Sensitive CdZnTe Gamma-Ray Spectrometers," *IEEE Transactions on Nuclear Science*, 47:3, pp. 890-893 (Jun. 2000).

F. Zhang, Z. He, D. Xu, G.F. Knoll, D.K. Wehe and J. Barry, "Improved Resolution for 3-D Position Sensitive CdZnTe Spectrometers," *IEEE Transactions on Nuclear Science*, 51:5, pp. 2427-2431 (Oct. 2004).

G. De Geronimo, P. O'Connor and J. Grosholz, "A Generation of CMOS Readout ASICs for CZT Detectors," *IEEE Transactions on Nuclear Science*, 47:6, pp. 1857-1867 (2000).

G. De Geronimo and P. O'Connor, "MOSFET Optimization in Deep Submicron Technology for Charge Amplifiers," *IEEE Transactions on Nuclear Science*, 52:6, pp. 3223-3232 (Dec. 2005).

G. De Geronimo, J. Fried, E. Frost, B.F. Philips, E. Vernon and E.A. Wulf, "Front-End ASIC for a Silicon Compton Telescope," *IEEE Nuclear Science Symposium Conference Record*, N54-6, pp. 2411-2415, (2007).

G. De Geronimo, P. O'Connor and J. Grosholz, "A CMOS baseline holder (BLH) for readout ASICs", *IEEE Trans. Nucl. Sci.*, vol. 47, pp. 812-822 (Jun. 2000).

G. De Geronimo, P. O'Connor and A. Kandasamy, "Analog CMOS Peak Detect and Hold Circuits. Part 1 and 2. Analysis of the Classical Configuration," *Nuclear Instruments and Methods in Physics Research* A 484, pp. 533-543 (2002).

A. Dragone, G. De Geronimo, J. Fried, A. Kandasamy, P. O'Connor and E. Vernon, "The PDD ASIC: Highly Efficient Energy and Timing Extraction for High-Rate Applications," *IEEE Nuclear Science Symposium Conference Record*, vol. 2, pp. 914-918 (2005).

S.E. Anderson, B. Dönmez and Z. He, "Sub-Pixel Position Resolution in Pixelated Semiconductor Detectors," *IEEE Nuclear Science Symposium Conference Record*, vol. 2, pp. 1569-1576 (2007).

H. Krawczynski, I. Jung, J. Perkins, A. Burger and M. Groza, "Thick CZT Detectors for Space-Borne X-Ray Astronomy," http://arxiv.org/abs/astro-ph/0410077v1 (2004).

H.H. Barrett, J.D. Eskin and H.B. Barber, "Charge Transport in Arrays of Semiconductor Gamma-Ray Detectors," *Physical Review Letter*, 75:1, pp. 156-159 (Jul. 1995).

U. Lachish, "Driving Spectral Resolution to the Noise Limit in Semiconductor Gamma Detector Arrays," *IEEE Transactions on Nuclear Science*, 48:3, pp. 520-523 (Jun. 2001).

A.R. Frolov, T.V. Oslopova and Y.N. Pestov, "Double Threshold Discriminator for Timing Measurements," *Nuclear Instruments and Methods in Physics Research*, A356, pp. 447-451 (1995).

W. Li, Z. Li, S. Zhu, S. Yin, B. Zhao, G. Chen, S. Yin, H. Yuan and H. Xu "Mercuric Iodide Single Crystals for Nuclear Radiation Detectors," *IEEE Transactions Nuclear Science*, 43:3, pp. 1369-1371 (Jun. 1996).

\* cited by examiner

METHOD AND APPARATUS FOR THE MEASUREMENT OF SIGNALS FROM RADIATION SENSORS

This invention was made with Government support under contract number DE-AC02-98CH10886, awarded by the U.S. Department of Energy. The Government has certain rights in the invention

BACKGROUND

High-Z semiconductor radiation sensors typically include a cathode electrode and at least one anode electrode. The cathode and anode are typically disposed on opposite ends of a detector medium. The detector medium is conventionally composed of cadmium zinc telluride (CdZnTe or CZT), mercuric iodide ($HgI_2$), or the like. An electrical potential is applied to the cathode and the anode to create an electrical field between the cathode and anode.

Cadmium-Zinc-Telluride (CZT) sensors have emerged as leading candidates in room-temperature, large-volume, gamma-ray spectrometry for security, medical, industrial, and space applications. More recently another wide-bandgap material, mercuric iodide ($HgI_2$), has been suggested as a potential candidate. The spectral resolution of these materials is strongly limited by several deficiencies (e.g., the poor mobility of holes, electron trapping, and extensive non-uniformities). Accordingly, various solutions have been proposed that link suitable electrode configurations with bi-parametric signal correction.

3-D Position-Sensitive Detectors (3DPSDs) are a form of high-Z semiconductor detectors that combine pixilation of an anode electrode with a measurement of amplitude and timing. This information is used to reconstruct a position at which the ionizing interaction occurred, and to correct the measurement on a voxel-by-voxel basis (voxel refers to volumetric pixel), thus compensating for the deficiencies. With this approach, energy resolutions better than 1% FWHM at 662 keV in CZT have been achieved, limited by the resolution of readout electronics. Additionally, employing the 3D correction method allows the use of lower-grade and larger size detectors in more applications.

In these sensors, ionizing radiation impinges upon the detector medium, which results in the generation of charge (electron-hole pairs) in an amount proportional to the energy of the ionization radiation. As a result of the electrical field generated between the cathode and the anode, the electrons drift towards the anode and the holes drift towards the cathode inducing electrical signals that are converted into voltages by charge amplifiers electrically coupled to the cathode and anode. In most cases, in order to improve the resolution of one of the two electrodes, the anode electrode is typically divided into an array of anodes, referred to herein as anode pixels. Each anode pixel in the array is generally connected to a dedicated charge amplifier.

Most high-Z semiconductor sensors, like those including cadmium zinc telluride (CdZnTe) or mercuric iodide ($HgI_2$), have poor charge transport properties. Holes have very low mobility, and during the signal processing time they essentially do not contribute to the electrical signal. Electrons typically have better mobility and are essentially the only contributors to the electrical signal.

A signal induced in the cathode starts developing at the time of the interaction of ionizing radiation in the detector medium and ends once the electrons reach one or more of the anodes. At the output of the charge amplifier, the cathode signal appears like a ramp with slope $V_C/T_C$ proportional to the ionized charge and duration $T_C$, which is equal to the electron travel time (i.e. duration $T_C$ and amplitude $V_C$ of the ramp are proportional to the depth of the ionizing event in the detector medium).

One conventional approach for measuring the timing of the cathode signal consists of filtering the cathode signal with a fast unipolar shaper (in order to improve the signal-to-noise performance) and measuring the time $t_{TH}$ at the crossing of a threshold $V_{TH}$. One drawback of this approach is the dependence of the timing measurement on the amplitude of the cathode signal. A correction of the measurement is required based on the measurement of the amplitude of anode and cathode signals. Due to the number of measurements involved, the resulting timing $t_0$ is affected by error in an amount that depends on the ionized charge and number of anodes involved.

Another conventional approach for measuring the timing of the cathode signal consists of continuously sampling the cathode signal at the output of the charge amplifier and, once the signal exceeds a threshold, extrapolating the timing of the signal from the multiple measurements. The sampling can be done by using multiple analog memories and providing analog-to-digital conversions at the end of the measurement or by using multiple analog-to-digital conversions in real time. Some drawbacks of this approach are moderate filtering with consequently poor signal-to-noise ratio, continuous switching or digital activity required by the multiple sampling before and during the waveform, and the requirement of multiple analog memories and associated analog-to-digital conversions that can limit in the rate capability of the detector.

Typically, due to the size of the anode pixels (small pixel effect), an anode signal induced in collecting anodes essentially only appears when the electrons arrive in proximity of the collecting anodes, and the amplitude of the anode signal is, in a first order, proportional to the charge and independent of the electrons travel time (i.e. independent of the depth of interaction of the ionizing event). At the output of the charge amplifier, the anode signal appears as a step with amplitude $V_A$ proportional to the ionized charge.

In addition to the poor charge transport properties, high Z semiconductor radiation sensors are affected by charge trapping. Charge trapping refers to electrons that become trapped while moving towards the anodes. The resulting anode and cathode signals are affected by an amount which depends on the traveling time. The charge trapping effects cause considerable degradation of the spectral response of these detectors because the amount of charge measured depends on the depth of the ionizing event.

To compensate for the charge trapping effects the amplitude of each anode signal can be corrected by measuring the depth of the interaction of the associated ionizing event. The depth of interaction is typically measured using one of two techniques. In the first method, the cathode to anode amplitude ratio is measured and in the second method the cathode-to-anode time delay is measured.

The first method typically consists of measuring the amplitudes $V_C$ and $V_A$ of the cathode and anode signals, respectively, and calculating the depth of interaction from the ratio $V_C/V_A$. In some cases, to improve the signal-to-noise ratio one or both of the signals are filtered with unipolar shapers. This approach is generally effective as long as the charge reaching the anodes is collected by a single anode. However, if the charge is collected by more than one anode (due to charge sharing or multiple-interacting events), the charge from each anode must be measured, and the sum from all involved anodes must be used in the ratio. For some anodes, the charge can be very small and the measurement can be strongly affected by noise. As a result, the spectral performance for ionizing interactions that result in charge sharing or multiple interacting events can be considerably degraded.

The second method generally consists of measuring the delay $T_C$ from the timing $t_0$ of the cathode signal (i.e. the timing of the event) to the timing $t_A$ of the anode signal (i.e. the time of arrival of the electrons to the anode). The anode timing $t_A$ is measured from the anode signal at the output of the charge amplifier. In some cases, to improve the signal-to-noise ratio, the anode signal is filtered with a fast unipolar shaper. The measurement of the cathode timing is typically more difficult than that of the anode timing because the ramp signal at the output of the charge amplifier for the cathode is very slow and initially very small in amplitude.

SUMMARY OF THE INVENTION

The preferred embodiments of the present invention include a readout unit for use in a radiation sensor. The radiation sensor can include a detector medium, a cathode, at least one anode, and the readout unit. The cathode is disposed at a first end of the detector medium. The at least one anode is disposed at an opposing end of the detector medium. The readout unit is operatively connected to the cathode and the at least one anode. The readout unit is configured to receive a cathode signal from the cathode in response to an ionizing event and to generate a bipolar shaped cathode signal based on the cathode signal. The bipolar shaped signal can have a first pulse corresponding to a first change in slope of the cathode signal and a second pulse corresponding to a second change in slope of the cathode signal. The readout unit is configured to determine an amount of time between a peak of the first pulse and a peak of the second pulse, the amount of time represents the depth of interaction.

The readout unit can include a charge amplifier for receiving a cathode signal and a timing shaper. The charge amplifier can be configured to output an amplified cathode signal. The timing shaper is operatively connected to the charge amplifier to receive the amplified cathode signal. The timing shaper configured to generate a first pulse in response to a beginning of the ionizing event and a second pulse in response to an end of the ionizing event. The first and second pulses are associated with a depth of interaction of the ionizing event and are generated in response to a slope of the amplified cathode signal changing.

The readout unit can also include a first timing detector that is operatively connected to the timing shaper and that is configured to receive the first and second pulses. The first timing detector determines an amount of time between the first and second pulses. The first timing detector can include a first peak detector to determine a first peak amplitude of the first pulse and a second peak detector to determine a second peak amplitude of the second pulse. The first timing detector can also include a discriminator and a time-amplitude converter (TAC). The discriminator can selectively pass at least a portion of the first pulse to the first peak detector based on a comparison of the first pulse with a threshold value. The TAC can determine the amount of time between the first and second pulses based on a first trigger signal received from the first peak detector and a second trigger signal received from the second peak detector. The TAC can determine the amount of time between the first and second pulses by subtracting a first time at which the first peak amplitude occurs from a second time at which the second peak amplitude occurs, where a peak amplitude of at least one of the first pulse and the second pulse is substantially proportional to a slope of the cathode signal.

The readout unit can include a second timing detector that is operatively connected to the timing shaper and that is configured to receive the cathode signal without modification by the timing shaper. The second timing detector can include discriminators and a TAC. The discriminators can receive the cathode signal and can be associated with different threshold values. The discriminators can determine whether to output at least a portion of the cathode signal based on a comparison of the cathode signal and the different threshold levels. The TAC can be configured to receive outputs from the discriminators and to determine a slope of the cathode signal based on the outputs.

The readout unit can be used to detect a depth of interaction of an ionizing event in a radiation sensor by generating a bipolar shaped cathode signal based on a cathode signal and determining an amount of time between a peak of the first pulse and a peak of the second pulse. The bipolar shaped signal can have a first pulse corresponding to a first change in slope of the cathode signal and a second pulse corresponding to a second change in slope of the cathode signal. The amount of time determined between the peaks of the first and second pulses represent the depth of interaction. The readout unit can be used to detect the depth of interaction of the ionizing event in the radiation sensor by identifying the peak of the first pulse using a peak detector configured to detect a peak in response to the peak detector receiving a discriminated signal.

The readout unit can be used to detect the depth of interaction of the ionizing event by generating an inverted bipolar shaped cathode signal to invert the first and second pulses. The inverted bipolar shaped cathode signal can be used to determine the peak of the second pulse.

The readout unit can further be used to detect the depth of interaction of the ionizing event by sampling the cathode signal in response to the cathode signal crossing thresholds, identifying times at which the cathode signal crosses the thresholds, and determining a slope of the cathode signal. The slope of the cathode signal used to estimate the depth of interaction.

Other objects and features of the present invention will become apparent from the following detailed description considered in conjunction with the accompanying drawings. One skilled in the art will recognize that the drawings are not drawn to the scale and are illustrative of the features of the present invention. It, therefore, is to be understood that the drawings are designed as an illustration only and not as a definition of the limits of the invention.

DETAILED DESCRIPTION OF THE EMBODIMENTS

The preferred embodiments of the present invention include readout units for 3D position-sensitive radiation detectors having low-noise charge amplification, and filtering, and that can perform measurements of amplitude and timing on signals from a cathode, anodes, and/or anode grid. The readout units can be configured to read-out signals from pixilated CZT sensors, characterized by an array of anodes and at least one, cathode. In response to an ionizing event, the readout units measure a peak amplitude and relative timing from anodes and at least one cathode. The readout units can be implemented as application specific integrated circuits (ASICs) that can be wire-bonded to a 22×22 mm$^2$ interposer, which can be connected to a sensor and which can be used for analog and digital power supplies and signals.

Figure 1:
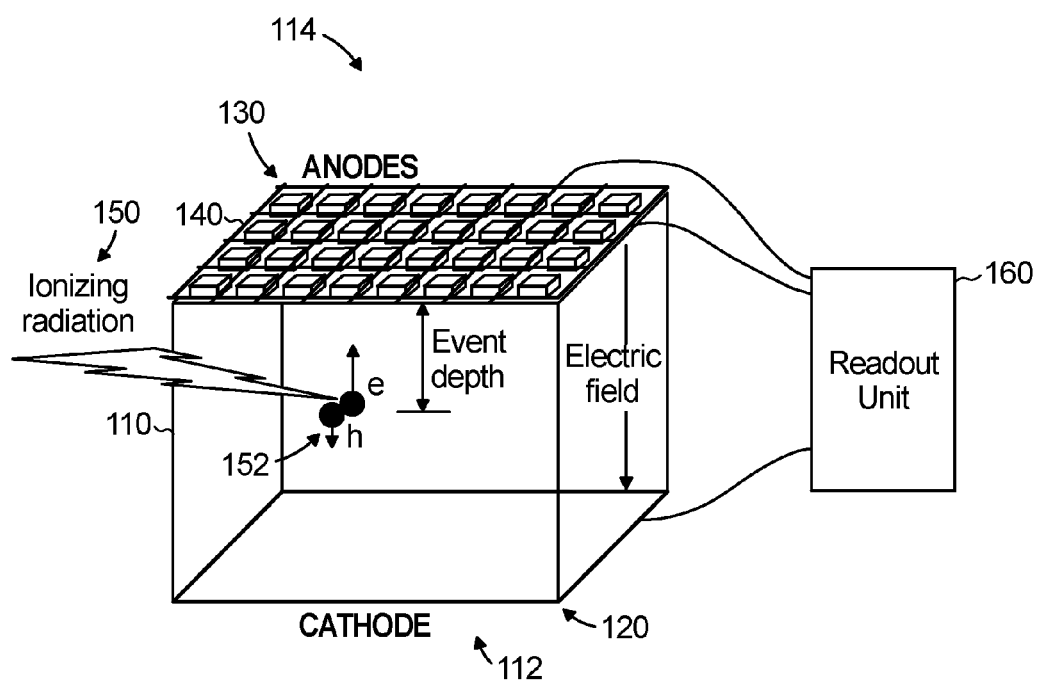
FIG. 1 is an exemplary radiation sensor configuration in accordance with the preferred embodiments of the present invention.

FIG. 1 depicts an exemplary position sensitive radiation detector 100 (detector 100). The detector 100 can include a detector medium 110, cathode 120, at least one anode, and preferably an array of anode pixels 130 and an anode grid 140. The detector medium 110 is preferably formed from CdZnTe, HgI$_2$, or the like. When ionizing radiation 150 impinges upon the detector medium 110, electron-hole pairs 152 are formed in the detector medium 110 creating a charge in the detector medium 110.

The cathode 120 is disposed on a first end 112 of the detector medium 110 and the anode pixels 130 are disposed on a second end 114 of the detector medium 110. The cathode 120 and anode pixels 130 are electrodes formed from a conductive material, such as aluminum, copper, gold, silver, and the like, and can have a generally planar plate-like configuration. An electrical potential is applied to the cathode 120 and the anode pixels 130 to generate an electric field between the cathode 120 and the anode pixels 130. The electric field generated between the cathode 120 and anode pixels 130 is generally sufficient to cause electrons of electron-hole pairs 152 to drift towards one or more of the anode pixels 130 inducing a charge in one or more of the anode pixels 130 and to cause holes of electron-hole pairs 152 to drift towards the cathode 120 inducing a charge in the cathode 120. The energy created (electron-hole pairs) from the ionizing radiation induces the charge in the cathode 120 to generate a cathode signal and induces the charge in one or more of the anode pixels 130 to generate one or more anode signals.

For embodiments that include the anode grid 140, the anode grid 140 can surround the anode pixels 130 in the plane of the anode pixels 130 to provide a common non-collecting grid. The anode grid 140 can be biased at a potential lower than that of anodes pixels 130. For embodiments where the anode grid 140 is biased at lower potential relative to that of the collecting anodes, electrons of electron-hole pairs 152 are guided towards the collecting anode pixels 130.

The cathode 120 and the anode pixels 130 are electrically connected to a readout unit 160. For embodiments inducing the anode grid 140, the anode grid 140 can also be electrically connected to the readout unit 100. The readout unit 160 reads one or more anode signals from one or more of the anode pixels 130, the cathode signal from the cathode 120, and the anode grid signal from the anode grid 140. While the present embodiment depicts a single readout unit 160, those skilled in the art will recognize that the cathode 120 and the anode pixels 130 can have separate readout units using some, all, or none of the circuitry of the readout unit 160.

The readout unit 160 can receive the anode, cathode, and anode grid signals generated in response to one or more ionizing events (i.e. ionizing radiation impinging upon the detector medium) and can process the anode, cathode, and anode grid signals to obtain information about the ionizing event, such as an amount of energy of the ionizing radiation and/or a depth of interaction of the ionizing event (i.e. a location at which the ionizing radiation impinged upon the detector medium 110). The anode signals can be processed using one or more anode channels. In the preferred embodiment, each anode signal is processed by a separate anode channel. Subsequent to processing of the anode signals, the anode signals can be combined to obtain an aggregate anode signal. The cathode and anode grid signals can be processed by cathode channels of the readout unit 100.

Figure 2:
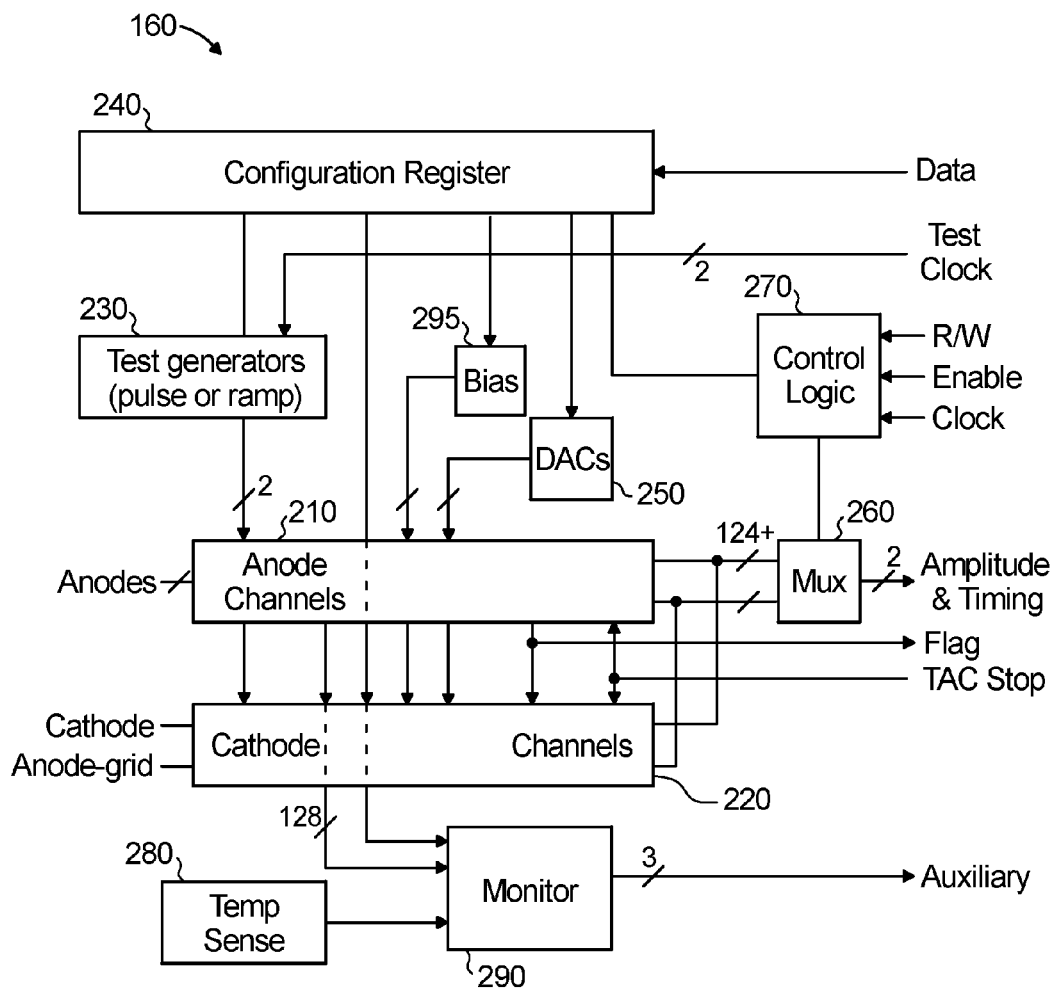
FIG. 2 is a block diagram of a readout unit measures the energy and depth of interaction of an ionizing event detected by a radiation sensor.

FIG. 2 is a block diagram of one embodiment of the readout unit 160. The readout unit 160 can include anode channels 210, cathode channels 220, test signal generators 230, at least one configuration register 240, Digital-to-Analog Converters (DACs) 250, multiplexers 260, control logic 270, at least one temperature sensor 280, monitor 290, and bias circuitry 295. In one embodiment, the readout unit 160 can have two cathode channels 210 corresponding to the cathode 120 and anode grid 140, one hundred twenty-two (122) anode channels 220 corresponding to one hundred twenty-two (122) anode pixels 130, two (2) test signal generators 230, six (6) DACs 250, and three (3) multiplexers 260. The cathode and anode channels can provide charge amplification, stabilized filtering, peak and timing detection with associated analog memories, and multiplexing. The anode channels preferably provide negative charge amplification (for anode signals) and the cathode channels preferably provide positive charge amplification (for cathode and anode-grid signals).

The readout unit 160 is controlled by a plurality of digital inputs/outputs (IOs). Some digital IOs (Enable EN, Flag FL, Clock CK, Cathode test clock CCKK, Anode test clock CCKA) are Low Voltage Differential (LVDS), and a 100 Ohm termination for the inputs (EN, CK, CCKK, CCKA) can be enabled by setting the SLVDS high. Other digital IOs (SDI, RST, E1, RW, CS, SLVDS) can be CMOS 2.5V.

The anode channels 210 can receive anode signals from the anode pixels 130 and can process the anode signals received to obtain energy and timing information associated with an ionizing event. In a preferred embodiment, the anode signals are processed by separate anode channels, where the anode channels are implemented in a substantially identical manner. Subsequent to processing of the anode signals, the anode signals can be combined to obtain an aggregate or total anode signal, which can be used to measure the total energy of an ionizing event.

The cathode channels 220 can receive the cathode signal and the anode grid signal and can process the cathode and grid signals to obtain information about an ionizing event. For example, at least one of the cathode channels 220 can be used to determine an amount of energy of the ionizing radiation and/or a depth of interaction of the ionizing radiation. One of the cathode channels can be used to process the cathode signal and another channel can be used to process the anode grid signal. In a preferred embodiment the cathode channels are implemented in a substantially identical manner.

The test signal generators 230 can output test signals to the anode and cathode channels to provide a mechanism for testing the operation of the anode and cathode channels 210 and 220, as well as the readout unit 160. The test signals can simulate anode, cathode, and anode grid signals that can be received by the anode and cathode channels 210 and 220 and can have an expected output associated with them. If the test signals do not generate the expected output, the readout unit 160 can indicate that the readout unit 160 and/or the specific channels of the readout unit are not functioning properly.

Alternatively, or in addition, the readout unit can output the outputs generated in response to the test signals and the user can determine whether the readout unit and the channels are operating as expected.

The configuration register 240 can receive information from a source internal and/or external to the readout unit 160. In some embodiments, the information can be instructions or commands that are processed by the configuration register 240. In response to the information received, the configuration register can operate to change a configuration of the readout unit 160. For example, the configuration unit can change parameters, such as time constants, associated one or more of the anode and cathode channels; can control the monitor output; can change a test signal generated by one or both of the test generators; and the like. To facilitate configuration, the configuration register can have a number of bits corresponding to various components, functions, configurations, and the like, of the readout unit 160. Table 1 provides an exemplary number of bits that can be implemented in the configuration register 240.

TABLE 1

Configuration Registers

| Register Bit Position | | Bits | Default Value | Description |
|---|---|---|---|---|
| 1 + (Ch-1) × 7 | Ch 1-62 | 124 | 0 | Channel mask (shaper shut-down) enable (active high). |
| 1 + (Ch-1) × 7 + 18 | Ch 63 | | | |
| 1 + (Ch-1) × 7 + 36 | Ch 64-124 | | | |
| 2 + (Ch-1) × 7 | Ch 1-62 | 124 | 0 | Test capacitor 200fF enable (active high). |
| 2 + (Ch-1) × 7 + 18 | Ch 63 | | | |
| 2 + (Ch-1) × 7 + 36 | Ch 64-124 | | | |
| 3 + (Ch-1) × 7 | Ch 1-62 | 124 | 0 | Enables channel output monitor if the channel is addressed using bits C0:C6. (active high). |
| 3 + (Ch-1) × 7 + 18 | Ch 63 | | | |
| 3 + (Ch-1) × 7 + 36 | Ch 64-124 | | | |
| 4:7 + (Ch-1) × 7 | Ch 1-62 | 496 | 0:0 | Channel Energy Threshold trim DAC, 3.5 mV step, 4-bit per channel, 1111 = 0 V, 0000 = −52.5 mV. |
| 4:7 + (Ch-1) × 7 + 18 | Ch 63 | | | |
| 4:7 + (Ch-1) × 7 + 36 | Ch 64-124 | | | |
| 8 + (Ch-1) × 7 | Ch 62 | 2 | 0 | Enables cathode timing channel output monitor (in place of cathode energy channel output monitor) if the channel is addressed using bits C0:C6. (active high). In this version only the positive bipolar is made available. |
| 8 + (Ch-1) × 7 | Ch 63 | | | |
| 9:12 + (Ch-1) × 7 | Ch 62 | 8 | 0:0 | Cathode Timing Channel Second Multi-Threshold trim DAC, 3.5 mV step, 4-bit per channel, 1111 = 0 V, 0000 = −52.5 mV |
| 9:12 + (Ch-1) × 7 | Ch 63 | | | |
| 13:16 + (Ch-1) × 7 | Ch 62 | 8 | 0:0 | Cathode Timing Channel Third Multi-Threshold trim DAC, 3.5 mV step, 4-bit per channel, 1111 = 0 V, 0000 = −52.5 mV |
| 13:16 + (Ch-1) × 7 | Ch 63 | | | |
| 17:20 + (Ch-1) × 7 | Ch 62 | 8 | 0:0 | Cathode Timing Channel First Multi-Threshold/Bipolar trim DAC, 3.5 mV step, 4-bit per channel, 1111 = 0 V, 0000 = −52.5 mV |
| 17:20 + (Ch-1) × 7 | Ch 63 | | | |
| 21:22 + (Ch-1) × 7 | Ch 62 | 4 | 0:0 | Cathode Timing Mode: 00 = Unipolar Mode, 10 = Multi Threshold + Unipolar Mode, 01 = Bipolar + Unipolar Mode, 11 = UnipolarMode |
| 21:22 + (Ch-1) × 7 | Ch 63 | | | |
| 23:26 + (Ch-1) × 7 | Ch 62 | 8 | 0:0 | Cathode Timing Channel Unipolar Threshold trim DAC, 3.5 mV step, 4-bit per channel, 1111 = 0 V, 0000 = −52.5 mV |
| 23:26 + (Ch-1) × 7 | Ch 63 | | | |
| 907 | | 1 | 0 | — |
| 908 | | 1 | 0 | Enable Single Event Mode (active high). |
| 909 | | 1 | 0 | Enable Monitor Outputs (active high). |
| 910 | | 1 | 0 | Routes the monitor to the pin TDO (active high). |
| 911 | | 1 | 0 | Enables Timing Channels Comparator multiple firing suppressor (active high). Suppression time adjusted with SS0:SS1. |
| 912 | | 1 | 0 | Enables Energy Channels Comparator multiple firing suppressor (active high). Suppression time adjusted with SS0:SS1. |
| 913 | | 1 | 0 | Disable Multiple Reset Acquisition Mode (active high). |
| 914 | | 1 | 0 | Disable Validation (active high). |
| 915:916 | | 2 | 0:0 | Binary coded selection of Anode Channels Peaking time. 00 = 0.25 μs, 10 = 0.5 μs, 01 = 1 μs, 11 = 2 μs |
| 917:918 | | 2 | 0:0 | Binary coded selection of Anode Channels PD Timeout. 00 = 1 μs, 10 = 2 μs, 01 = 4 μs, 11 = 8 μs |
| 919:920 | | 2 | 0:0 | Binary coded selection of Anode Channels TD ramp length RD. 00 = 1 μs, 10 = 2 μs, 01 = 3 μs, 11 = 4 μs. Nominal baseline 230 mV. Nominal slope 2 V/μs, 1 V/μs, 666 mV/μs, 500 mV/μs. |
| 921 | | 1 | 0 | Buffer Enable for Channel 62 Preampliefier Monitor Output (active high). |
| 922 | | 1 | 0 | Buffer Enable for Channel 63 Preampliefier Monitor Output (active high). |
| 923:924 | | 2 | 0:0 | Binary coded selection of Chatode Channels Energy Shaper Peaking time. 00 = 0.25 μs, 10 = 0.5 μs, 01 = 1 μs, 11 = 2 μs |
| 925:926 | | 2 | 0:0 | Binary coded selection of Cathode Channels PD Timeout. 00 = 1 μs, 10 = 2 μs, 01 = 4 μs, 11 = 8 μs |
| 927:928 | | 2 | 0:0 | Binary coded selection of Cathode Channels TD ramp length RD. 00 = 1 μs, 10 = 2 μs, 01 = 3 μs, 11 = 4 μs. Nominal baseline 230 mV. Nominal slope 2 V/μs, 1 V/μs, 666 mV/μs, 500 mV/μs. |
| 929:930 | | 2 | 0:0 | Binary coded selection of Chatode Timing Channels Shaper Peaking time. 00 = 0.1 μs, 10 = 0.2 μs, 01 = 0.4 μs, 11 = 0.8 μs |
| 931 | | 1 | 0 | Internal leakage current generator (about 50 pA). 0 = enabled. |

TABLE 1-continued

Configuration Registers

| Register Bit Position | Bits | Default Value | Description |
|---|---|---|---|
| 932:938 | 7 | 0:0 | Auxiliary Monitor Output Address. To address a channel shaper output, bit SOM must be set high. 000001 is Ch1, 111100 is Ch.124. 1111110 addresses the temperature monitor. 1111111 addresses the global DACs monitor (to be used togheter with DD0:DD2). Can be buffered if SBA is set high. |
| 939 | 1 | 0 | Buffer Enable for the Peak and Time Detectors outputs. 0 = disabled. |
| 940 | 1 | 0 | Buffer Enable for the Auxiliary Monitor Output. 0 = disabled. |
| 941:943 | 3 | 0:0 | Address of DAC monitor. Bit SOM must be set low. 000 = Anode Energy Threshold DAC, 001 = Cathode Energy Threshold DAC, 010 = Cathode Timing Unipolar Threshold DAC, 011 = Cathode Timing First Multi-Threshold DAC, 100 = Cathode Timing Second Multi-Threshold DAC, 101 = Cathode Timing Third Multi-Threshold DAC, 110 = Anode test signal after 2:7 divider (actual test pulse level), 111 = Cathode test signal after 2:7 divider (actual test pulse level). |
| 944 | 1 | | Cathode Channel Input for Test Mode: 0 = Step, 1 = Ramp |
| 945:948 | 4 | | 4-bit DAC for Cathode Timing Channels Secondary Multi-Thresholds Displacement, −100 mV full scale, ~6.25 mV step, 0:0 = fullscale. |
| 949:950 | 2 | 0:0 | Adjusts multiple firing suppression time. 00 = 150 ns, 10 = 300 ns, 01 = 600 ns, 11 = 1.2 μs. |
| 951:960 | 10 | 0:0 | 10-bit DAC for Cathode test pulse, 1.85 V full scale, ~1.85 mV step, 0 mV baseline, followed by 2:7 voltage divider. 0:0 = baseline. Adjusts the step height if TL = 0, the ramp slope if TL = 1 |
| 961:970 | 10 | 0:0 | 10-bit DAC for Anode test pulse, 1.85 V full scale, ~1.85 mV step, 0 mV baseline, followed by 2:7 voltage divider. 0:0 = baseline. Adjusts the step height. |
| 971:980 | 10 | 0:0 | 10-bit DAC for Cathode Timing Channels Primary Multi-Threshold and Bipolar Threshold, 1.85 V full scale, ~1.85 mV step, 0 mV baseline. 0:0 = baseline. |
| 981:990 | 10 | 0:0 | 10-bit DAC for Cathode Timing Channels Unipolar Threshold, 1.85 V full scale, ~1.85 mV step, 0 mV baseline. 0:0 = baseline. |
| 991:1000 | 10 | 0:0 | 10-bit DAC for Cathode Channels Energy Threshold, 1.854 V full scale, ~1.85 mV step, 0 mV baseline. 0:0 = baseline. |
| 1001:1010 | 10 | 0:0 | 10-bit DAC for Anode Channels Energy Threshold, 1.85 V full scale, ~1.85 mV step, 0 mV baseline. 0:0 = baseline.. |
| | 1010 | Total bits | |

The configuration of some components in the readout unit 160 can require analog signals. The DACs 250 can receive information, such as configuration changes from the configuration register 240, in the form of digital signals and can convert the digital signals to analog signals. The analog signals can be output from the DACs 250 to those components associated with the analog configuration information. For example, portions of the anode and cathode channels 210 and 220 can be configurable using analog signals.

The multiplexers 260 can be used for reading out the outputs of the anode and cathode channels 210 and 220. The multiplexers 260 can have an input corresponding to each of the anode channels and cathode channels. For example, in a preferred embodiment, the multiplexers 260 can have one hundred twenty-four (124) inputs corresponding to one hundred twenty-two (122) anode channels and two (2) cathode channels. The multiplexers 260 can have one or more outputs to output the processed anode and cathode signals of the anode and cathode channels from the readout unit 160. One or more control signals can be received by the multiplexers 260 to control which of the anode and/or cathode signals are output from the multiplexer. For example, the multiplexers 260 can have one (1) output and one hundred twenty four (124) inputs so that the multiplexer 260 is a 124:1 multiplexer and the control signal can determine which of the inputs is passed to the output.

The control logic 270 can control the operation of the readout unit 160. The control logic 270 can receive signals from a source that is external to the readout unit 160 so that the readout unit 160 can interface with other devices and can output signals to components of the readout unit 160. For example, the control logic 270 can receive a read/write signal, an enable signal, and one or more clock signals. In response to these signals, the control unit 270 can generate outputs for controlling the operation of the anode channels 210, cathode channels 220, test signal generators 230, configuration register 240, DACs 250, multiplexer 260, temperature sensor 280, monitor 290, and bias circuitry 295. For example, the control logic can output one or more clock signals to the configuration register 240, DACs 250, and the multiplexer 260, can output one or more control signals to start and/or stop the operation of the readout unit or the components of the readout units 140, and can output one or more power down or power up signals for turning the readout unit 160 or components thereof off and on, respectively.

The temperature sensor 280 can provide information concerning the temperature of the readout unit 160. The temperature sensor can generate an output associated with the temperature of the readout unit 160 to ensure that the readout unit 160 is operating within a specified temperature range. The temperature sensor can be characterized by a nominal response of 1.52 V+5.67 mV/° C. and an output of the temperature sensor can be passed to an input of the monitor 290.

The monitor 290 can act as a bypass or auxiliary output of the readout unit 160 so that, for example, some or all of the processing performed by the anode and cathode channels 210 and 220 can be output from the readout unit 160 prior to complete processing of the anode and cathode signals through the anode and cathode channels 210 and 220.

The bias circuitry 295 can be formed to supply power to the components of the readout unit 160 at a desired bias level. For example, the bias circuitry can have voltage and current sources that provide voltage or current to the anode channels 210, cathode channels 220, test signal generators 230, configuration register 240, DACs 250, multiplexer 260, control logic 270, temperature sensor 280, and monitor 290.

The readout unit 160 can operate in two sequential phases, acquisition and readout, controlled by an external Low Voltage Differential Signal (LVDS) enable EN signal received by the control logic 270. The acquisition phase can read out and process the anode and cathode signals, and the readout phase can output the information obtained from the processing performed on the anode and cathode signals so that the information is available to electronic devices external to the readout unit 160. When the enable signal EN is high and the readout unit 160 operates in the acquisition phase, the anode and cathode channels become sensitive to anode and cathode signals corresponding to an ionizing event. When an ionizing event occurs and a first peak is found, the readout unit 160 releases a LVDS flag FL signal, which can initiate timing acquisition, and the acquisition can be stopped by lowering the enable EN signal. The lowering of the enable EN can be used as a stop trigger for acquisition by the readout unit and can be used to place the readout unit into the readout mode. In readout mode, the outputs of the anode and cathode channels (energy and timing) are made sequentially available, based on a LVDS clock CK signal, at two dedicated outputs of the readout unit 160.

The readout unit 160 can identify ionizing events based on anode signals such that when the enable EN high, the readout unit is in the acquisition mode and when the anode signal exceeds a specified threshold, the peak amplitude and timing measurements are enabled in each of the anode channels. The flag FL can be released after a specified delay, such as 200 ns, when the first peak of an anode signal is found. The anode channels process the amplitude and timing of the highest peak until the acquisition stops in response to the enable EN going low. In one embodiment, the timing can be measured from the first peak, which can be valuable for extracting timing information from inductions occurring in those pixels neighboring the ones above threshold. Anode channels that do not exceed the threshold can be forced to store that amplitude at the time of the first above-threshold peak. This information can be useful to force the sampling of negative amplitudes that may result from induction in the pixels next to the ones above threshold.

A cathode signal exceeding the threshold is processed for peak amplitude and timing, but such a processing preferably does not trigger the flag FL signal. The cathode channel continues processing the amplitude and timing of the highest peak until the acquisition stops in response to the enable signal EN going low.

Some, all, or none of the input and output signals of the readout unit 160 can be low-voltage differential signals (LVDS). For example, the readout unit can receive an LVDS clock signal, enable EN signal, and data signal, while the anode and cathode signals can be received as analog signals and the processed anode and cathode signals can be output as analog signals.

Figure 3:
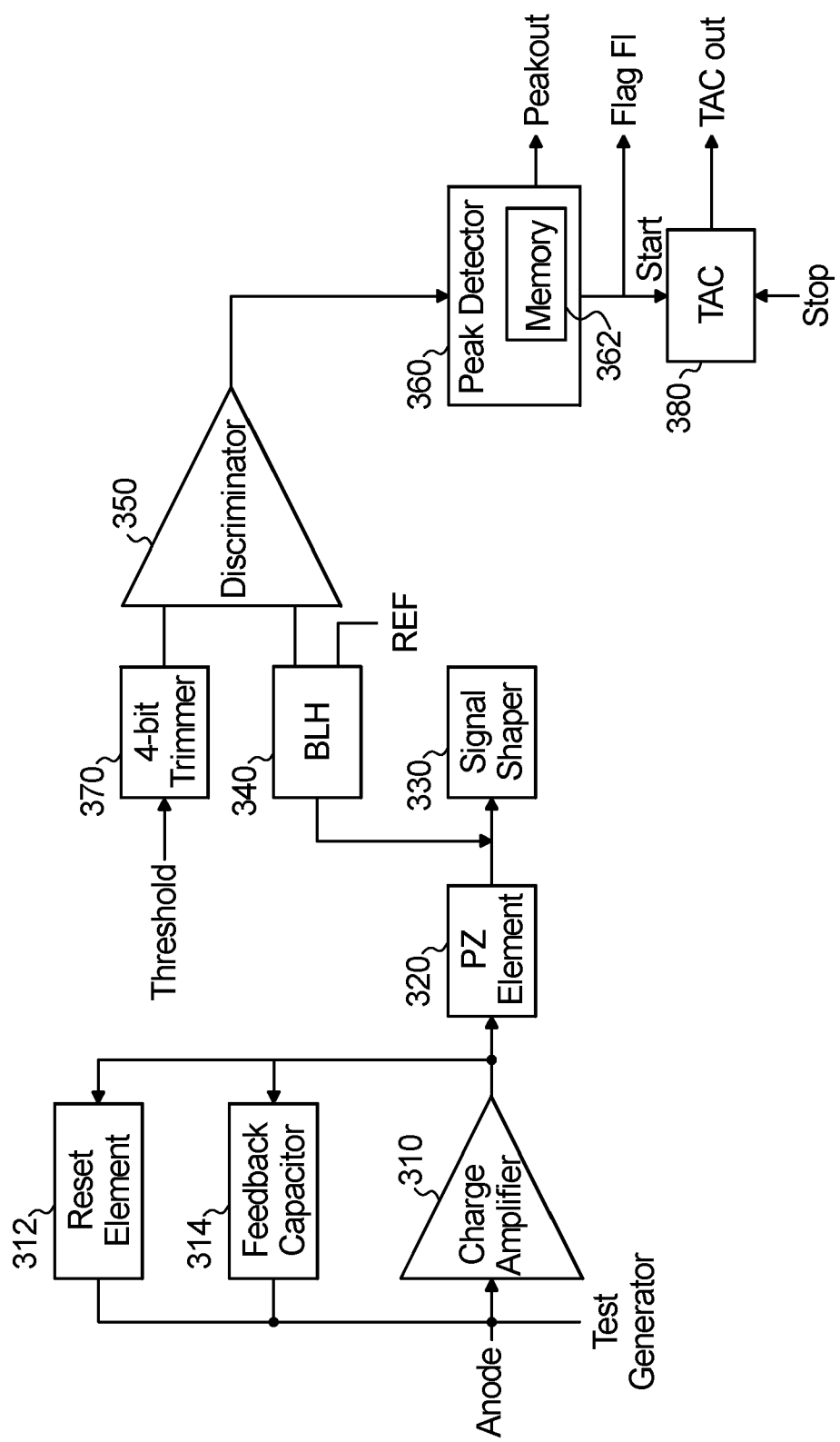
FIG. 3 is a block diagram of an anode channel of the readout unit of FIG. 2.

FIG. 3 is a block diagram of one embodiment of an anode channel 300, where the anode channel 300 can be implemented for each of the anode channels 210 such that each of the anode channels 210 can be implemented in an identical manner. The anode channel 300 can include a charge amplifier 310, pole-zero cancellation element 320 (hereinafter "PZ element 320"), a signal shaper 330, a base line holder (BLH) 340, a discriminator 350, a peak detector 360, a trim element 370, and a Time-Amplitude Converter (TAC) 380.

The charge amplifier 310 can receive an anode signal from one or more of the anode pixels 130 and can amplify the anode signal for subsequent processing. The charge amplifier 310 can be implemented as a low-noise charge amplifier optimized for about 3.3 pF input capacitance with a test capacitor and continuous reset adaptive to leakage currents up to about 50 nA. The output of the charge amplifier 310 can be operatively connected to a reset element 312 and a feedback capacitor 314, the output of each being operatively connected back to the input of the charge amplifier 310. The reset element 312 can absorb leakage current associated with the charge amplifier 310 and can be used to maintain a continuously closed dc path at a high impedance. The input of the charge amplifier 310 can also be connected to an output of one of the test signal generators 230 when testing of the anode channel 300 is desired. The output of the charge amplifier is also operatively connected to an input of the PZ element 320.

The PZ element 320 can be used to ensure high linearity and low noise before shaping is performed on the anode signal. The circuitry of the PZ element 320 can be configured to match the feedback of the first amplifier. The PZ element 320 is followed by the signal shaper 330 and the BLH 340.

The signal shaper 330 can receive the output of the PZ element 320 and can process the anode signal. The signal shaper 330 can be a $5^{th}$ order unipolar shaping amplifier with complex conjugate poles and an adjustable peaking time (e.g., 0.25 µs, 0.5 µs, 1 µs, and 2 µs). The signal shaper 330 can generate a pulse in response to a change in the slope of the anode signal with an amplitude that is substantially proportional to the slope of the anode signal. The signal shaper 330 can output a shaped anode signal with the pulse.

The output of the signal shaper 330 can be operatively connected to an input of the BLH 340, which can also receive a reference signal REF. The BLH 340 can operate to output a stabilizing reference signal to the input of the signal shaper 330 to ensure that the dc value of the anode signal entering the signal shaper 330 is at a constant value, which is determined in part by the reference signal REF.

The output of the signal shaper 330 is also operatively connected to the input of the discriminator 350, which is preferably configured to have low hysteresis, and to the peak detector 360. The discriminator 350 also receives a threshold signal via a 4-bit trimmer 370 and operates to compare the shaped anode signal to the threshold signal. The discriminator 350 can have a multiple-firing suppression option enabled and controlled in length based on a configuration using the configuration register 240 (FIG. 2). The discriminator 350 prevents the shaped anode signal from passing to an output of the discriminator 350 when the amplitude of the shaped anode signal does not satisfy a threshold condition (i.e. when the anode signal is not greater than or is not less than the threshold value). When the shaped anode signal satisfies the threshold condition, the discriminator 350 passes the shaped anode signal to its output, which is operatively connected to an input of the peak detector 360. As such, the discriminator 350 selectively passes the shaped anode signal to the peak detector 360 so that the peak detector 360 receives only a portion of the shaped anode signal from the discriminator 350, which is referred to herein as a discriminated anode signal.

The peak detector 360 receives the shaped anode signal from the signal shaper 330 and the discriminated anode signal from the discriminator 350, and determines the peak amplitude of the anode signal based on the amplitude of the shaped anode signal. The peak detector 360 can be configured to detect a peak only when the discriminator 350 passes an output to the peak detector 360. This can prevent the peak detector 360 from falsely identifying noise in the circuit as a peak. A processed anode signal corresponding to the peak amplitude of the anode signal can be output from the peak detector 360 to an input of at least one of the multiplexers 260 (FIG. 2). The at least one of the multiplexers 260 can operate to output the peak amplitude of the anode signal from the readout unit 160 when the corresponding anode channel is selected by the control signal received by the at least one of the multiplexers 260. The amplitude of the pulse can be measured and stored in memory 362, preferably analog memory, using a multi-phase peak-detection configuration implemented in the peak detector 360.

The TAC 380 can convert the timing of the anode event into a voltage. The TAC 380 receives processed anode signal, or a signal corresponding to the processed anode signal, such as a start signal, from the peak detector 360, which can operate as a trigger signal. In response to the trigger signal, the TAC 380 can initiate a ramp signal so that the ramp signal starts to increase or decrease when the trigger signal is released by the peak detector at the time of the peak of the processed anode signal. An external trigger signal, such as a stop signal, which corresponds to the enable EN signal, can be used to stop the ramp from increasing or decreasing and can correspond to an end of the ionizing event.

Figure 4:
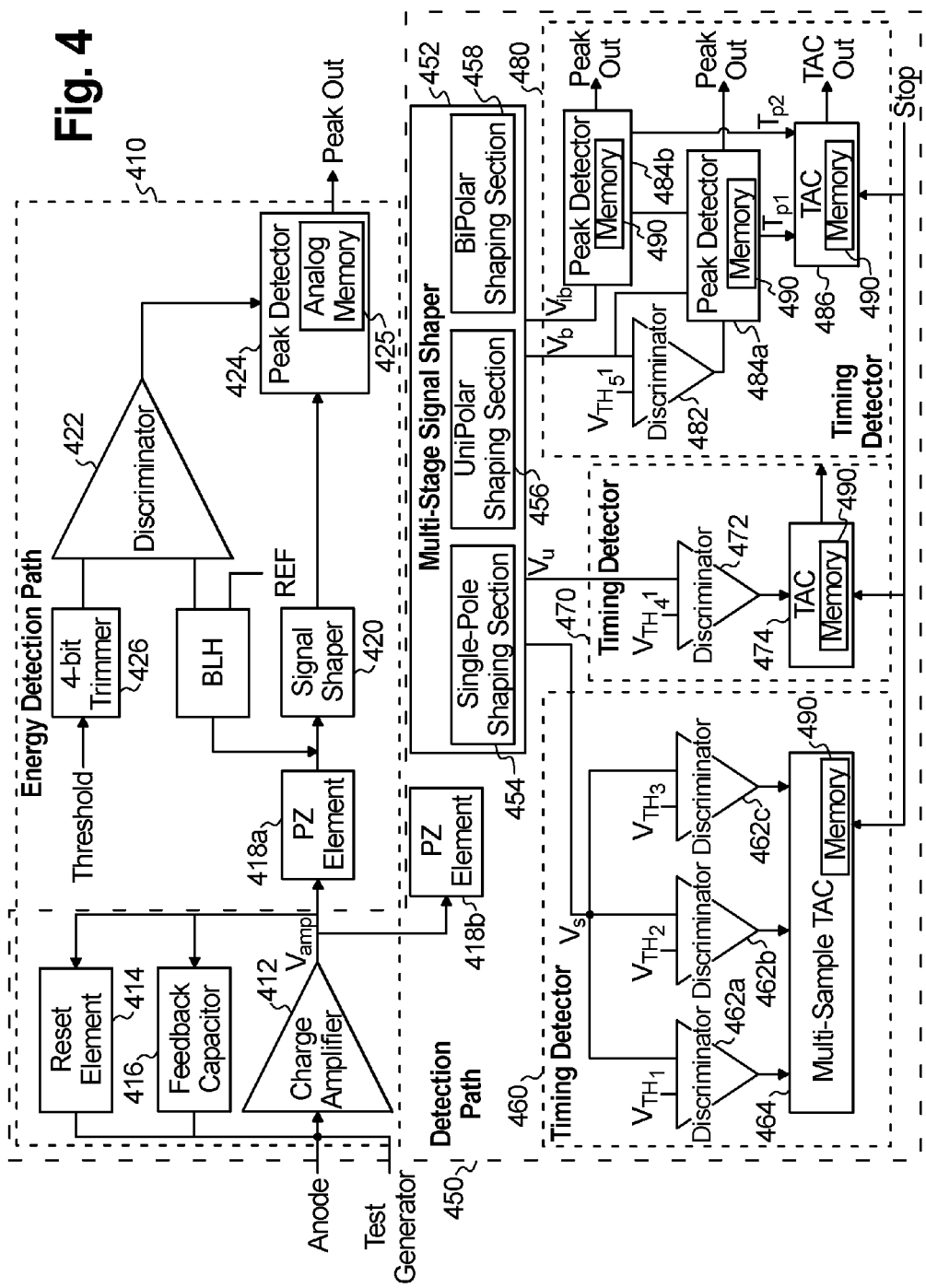
FIG. 4 is a block diagram of a cathode channel of the readout unit of FIG. 2.

FIG. 4 is a block diagram of one embodiment of a cathode channel 400, where the cathode channel 400 can be implemented for each of the cathode channels 220 such that each of the cathode channels 220 can be implemented in an identical manner. The cathode channel 220 can include an energy detection path 410 and a timing path 450.

The energy detection path 410 and the timing detection path 450 can share a charge amplifier 412, which can receive a cathode signal from the cathode or an anode grid signal from the anode grid. While the present embodiment of the cathode channel 220 is discussed with respect to the cathode signal, those skilled in the art will recognize that anode grid signal can be processed in an identical manner. The charge amplifier 412 can amplify the signal for subsequent processing. The charge amplifier 412 can be implemented as a low-noise charge amplifier optimized for about 6.3 pF input capacitance with a test capacitor and continuous reset adaptive to leakage currents up to about 50 nA. The output of the charge amplifier 412 can be operatively connected to a reset element 414 and a feedback capacitor 416, the output of each being operatively connected back to the input of the charge amplifier 412. The reset element 414 can absorb leakage current associated with the charge amplifier 412 and can be used to maintain a continuously closed dc path at a high impedance. The input of the charge amplifier 412 can also be connected to an output of one of the test signal generators 230 when testing of the cathode channel 412 is desired. The output of the charge amplifier 412 is also operatively connected in parallel to two pole-zero cancellation elements 418a-b (hereinafter "PZ elements 418a-b"), one for energy detection path 410 and one for the timing detection path 450.

The energy detection path 410 can have a configuration similar to the anode channel 210 including the PZ element 418a, a signal shaper 420, a discriminator 422 having an associated threshold value, and the multi-phase peak detector 424, in addition to the charge amplifier 412. The PZ element 418a can be used to ensure high linearity and low noise before shaping is performed on the cathode signal. The circuitry of the PZ element 320 can be configured to match the feedback of the first amplifier. The PZ element 418a is followed by the signal shaper 420 and the BLH 421, which maintains a substantially stable dc reference value at the input of the signal shaper 420.

An output of the PZ element 418a is operatively connected to an input of the signal shaper 420. The signal shaper 420 can receive the output of the PZ element 418a and can process the cathode signal. The signal shaper 420 can be a $5^{th}$ order unipolar shaping amplifier with complex conjugate poles and an adjustable peaking time (e.g., 0.25 µs, 0.5 µs, 1 µs, and 2 µs). The signal shaper 420 can generate a pulse in response to a change in the slope of the cathode signal with an amplitude that is substantially proportional to the slope of the cathode signal. The signal shaper 420 can output a shaped cathode signal represented by a pulse.

The output of the signal shaper 420 is operatively connected to the input of the discriminator 422, which can be low-hysteresis, and to the peak detector 424. The discriminator 422 receives the threshold signal via a 4-bit trimmer 426 and operates to compare the shaped cathode signal to the threshold signal. The discriminator 422 can have a multiple-firing suppression option enabled and controlled in length based on a configuration using the configuration register. The discriminator 422 prevents the shaped cathode signal from passing to the output of the discriminator 422 when the amplitude of the shaped cathode signal is less than the value of the threshold signal. When the shaped cathode signal exceeds the value of the threshold signal, the discriminator 422 passes the shaped cathode signal to its output, which is operatively connected to an input of the peak detector 424. As such, the discriminator 422 selectively passes the shaped cathode signal to the peak detector 424 so that the peak detector 424 receives only a portion of the shaped cathode signal from the discriminator 424, which is referred to herein as a discriminated cathode signal.

The peak detector 424 receives the shaped cathode signal from the signal shaper 420 and the discriminated signal from the discriminator 422, and determines the peak amplitude of the cathode signal based on the amplitude of the shaped cathode signal. The peak detector 424 can be configured to detect a peak only when the discriminator 422 passes an output to the peak detector 424. This can prevent the peak detector 424 from falsely identifying noise in the circuit as a peak. A processed cathode signal corresponding to the peak amplitude of the anode signal can be output from the peak detector 424 to an input of one or more of the multiplexers 260. The multiplexers 260 can operate to output the peak amplitude of the cathode signal from the readout unit 160 when the corresponding cathode channel 220 is selected by the control signal received by the multiplexers 260. The amplitude of the pulse can be measured and stored in memory, preferably analog memory 425, using a multi-phase peak-detection configuration implemented in the peak detector 424.

The timing path 450 can be used for determining a depth of interaction of an ionizing event. The timing path 450 can share the charge amplifier 412 with the amplitude detection path 410 and can include the PZ element 418b, which is implemented in an identical manner to the PZ element 418b, a multi-stage signal shaper 452, and multiple timing detectors 460, 470, and 480.

The multi-stage timing shaper 452 can be configured to receive the cathode signal from the output of the charge amplifier 412, via the PZ element 418b, and to output one or more shaped cathode signals. For example, the timing shaper 452 can output a single-pole shaped cathode signal from a single-pole shaping section 454 that provides a replica of the output of the charge amplifier 412, a unipolar shaped cathode signal from a unipolar shaping section 456 having $3^{rd}$ order unipolar-shaping with complex conjugate poles and an adjustable peaking time (100 ns, 200 ns, 400 ns, and 800-ns), a bipolar shaped cathode signal from a bipolar shaping section 458 that provides a differentiation on the unipolar shaping, meaning bipolar shaping having both positive and negative pulses (peaking time about 50 ns, 100 ns, 200 ns, and 400 ns), and an inverted version of the bipolar shaped cathode signal from the bipolar shaping section 458. These outputs can measure the timing of the cathode signal via three different timing techniques. The single pole shaped cathode signal can be input to the timing detector 460. The unipolar shaped cathode signal can be input to the timing detector 470. The bipolar shaped cathode signal and the inverted bipolar shaped cathode signal can be input to the timing detector 480.

The timing detector 460 receives single pole shaped cathode signal from the multi-stage timing shaper 452 so that processing is performed directly on the output voltage of the charge amplifier 412 (without shaping). The cathode signal at the output of the charge amplifier 412 is, to a first order, a ramp whose slope is proportional to the energy of the ionizing event, and whose duration is proportional to the depth of interaction of the ionizing event. The timing detector 460 can use discriminators 462a-c, and a multi-sample TAC 464 (hereinafter "TAC 464") with ramp durations that can be adjustable to 1 µs, 2 µs, 3 µs, and 4 µs. The single pole shaped signal is input to the discriminators 462a-c and compared to the threshold values associated with the discriminators 462a-c. The threshold values can be set at different levels.

When the single pole shaped cathode signal exceeds a first threshold value associated with the discriminator 462a, the discriminator outputs a first start signal to the TAC 464, which initiates a ramp signal. When the single pole shaped cathode signal exceeds the threshold values associated with the discriminators 462b and 462c, the discriminators 462a and 462b output trigger signals to the TAC 464. The TAC 464 can sample a value of the ramp for the three trigger signals and using the timing of the crossing of three different thresholds, the slope of the cathode signal (i.e., the energy) can be reconstructed, as can the timing at the departing point of the ramp (i.e., the time of interaction). The timing detector 460 can require energy information from the anode pixels for those cathode signals that cross only the first threshold associated with the discriminator 462a. The TAC 464 can convert the timing of the ionizing event into a voltage that can be output to one or more of the multiplexers 260 for readout from the readout unit 160.

Figure 5:
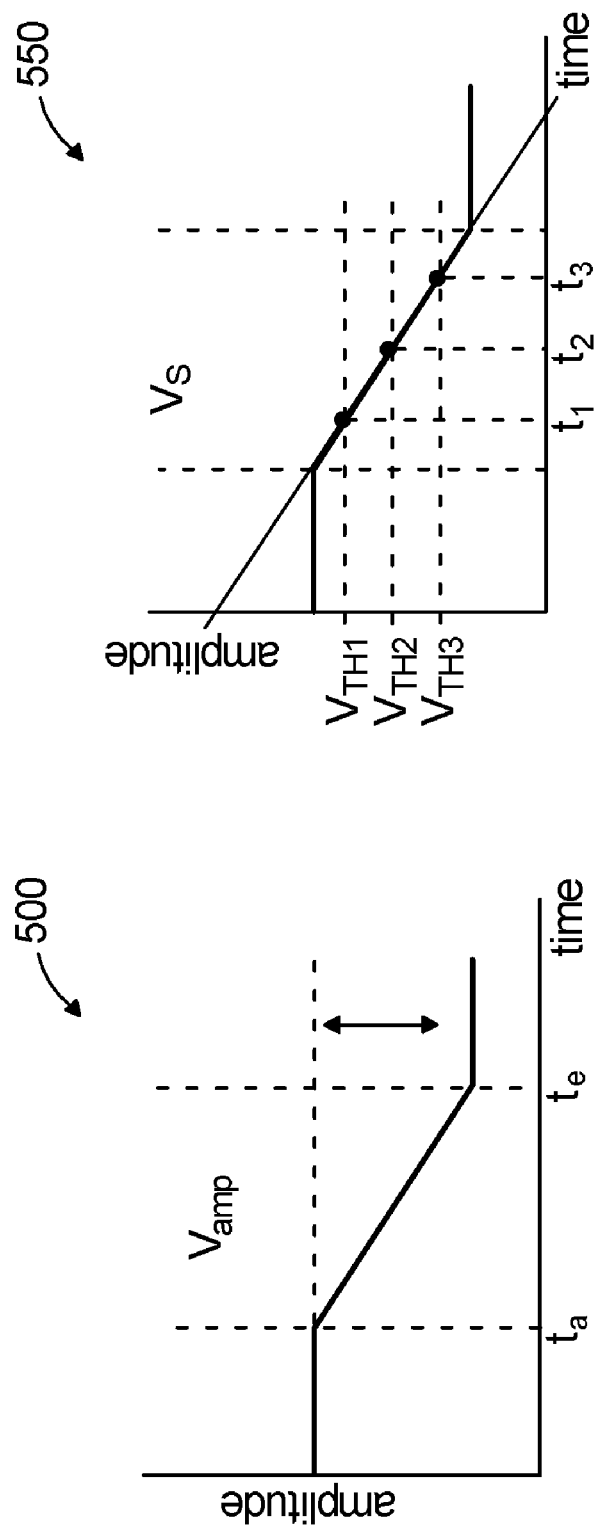
FIGS. 5-7 are graphs of various outputs of the cathode channel of FIG. 4

FIG. 5 is a graph of the signals associated with the timing detector 460 (FIG. 4). Graph 500 corresponds to the output of the charge amplifier 412, which represents the amplified cathode signal $V_{amp}$. The graph 500 includes a y-axis associated with the amplitude of the amplified cathode signal $V_{amp}$ and the x-axis corresponds to time. The slope of the amplified cathode signal $V_{amp}$ changes in response to an ionizing event, which occurs at time to so that the amplified cathode signal $V_{amp}$ has a decreasing amplitude in the form of a ramp. When the ionizing event ends (i.e. once one of the anode pixels has collected electrons), which is represented as time $t_e$, the slope of the amplified cathode signal $V_{amp}$ changes.

Graph 550 represents the voltage $V_s$ output going through the timing detector 460. The voltage $V_s$ is substantially equal to the amplified cathode signal $V_{amp}$. As the voltage $V_s$ decreases, the voltage $V_s$ is compared to the threshold values $V_{TH1}$, $V_{TH2}$, and $V_{TH3}$ associated with the discriminators 462a-c. The TAC notes the amplitude of $V_s$ and the time which $V_s$ crosses the thresholds $V_{TH1}$-$V_{TH3}$. Using this information, a slope of the voltage $V_s$, and ultimately, of the amplified cathode signal $V_{amp}$ can be determined. The slope can be used to determine a peak amplitude of the cathode signal and a depth of interaction of the ionizing event.

Referring back to FIG. 4, the timing detector 470 receives the unipolar shaped cathode signal from the multi-stage timing shaper 452. The timing detector 470 includes a discriminator 472 having an associated threshold value and a TAC 474. The timing detector 470 measures the timing at the threshold crossing of a unipolar shaped cathode signal. Since the time of the threshold crossing depends on the amplitude of the pulse and induction time, measurements using the timing detector 470 can exhibit considerable dependence on the energy and depth of interaction, requiring additional calibration based on energy information from the anode pixels.

Figure 6:
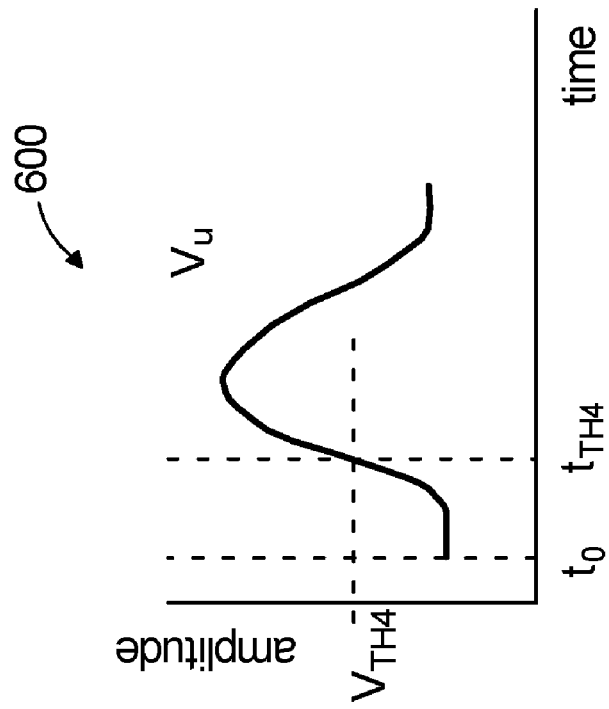
Figure 6:
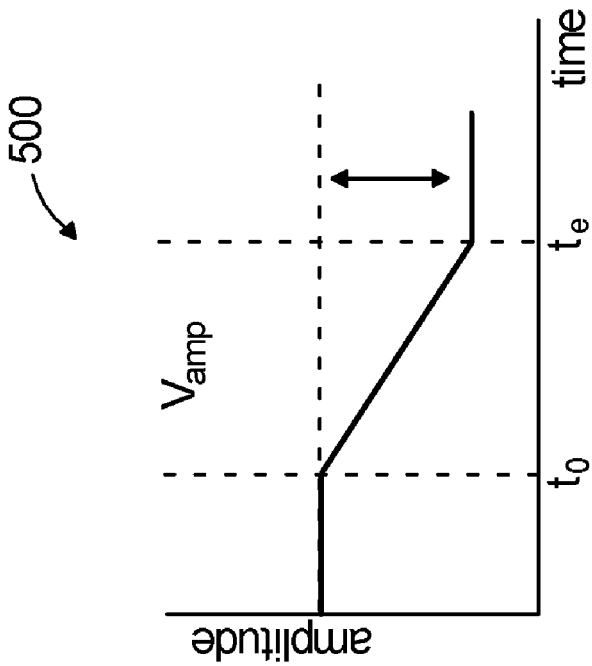

FIG. 6 is a graph of the signals associated with the timing circuit 470. The graph 500 again corresponds to the output of the charge amplifier 412, which represents the amplified cathode signal $V_{amp}$. Graph 600 represents an output voltage $V_u$ of the unipolar shaping section 456 of the multi-stage timing shaper 452 (FIG. 4). The output voltage $V_u$ is a pulse that begins to increase at the time to when the ionizing event occurs and peaks some time later before decreasing. The voltage $V_u$ is compared to the threshold values $V_{TH4}$ associated with the discriminators 472. The TAC notes the amplitude of $V_u$ and the time $t_{th4}$ at which $V_u$ crosses the thresholds $V_{TH4}$. Using this information, and information obtained from the anode signals, such as a time at which the anode signal occurs, a peak amplitude of the cathode signal and a depth of interaction of the ionizing event can be determined.

Referring again to FIG. 4, the timing detector 480 receives a bipolar shaped cathode signal and an inverted bipolar shaped cathode signal from the multi-stage timing shaper 452. The timing detector 480 includes a discriminator 482 having an associated threshold value, a peak detectors 484a-b, and a multi-sample TAC 486 (hereinafter "TAC 486"). The bipolar shaped signal can be received by an input of the discriminator 482 and an input of the peak detector 484a. The inverted bipolar shaped signal can be input into the peak detector 484b. The discriminator 482 can pass a portion of the bipolar shaped signal that exceeds the threshold value associated with the discriminator 482. The peak detector 484a can use the bipolar shaped cathode signal and the discriminated cathode signal to determine a peak amplitude of the cathode signal and can output a first trigger $T_{p1}$, signal corresponding to the temporal occurrence of this peak. In a preferred embodiment, the peak detector 484a can be configured to detect positive peaks, although those skilled in the art will recognize that the peak detector can be configured to detect positive and/or negative peaks.

The inverted bipolar shaped signal inverts the polarity of pulses produced by the multi-stage timing shaper 452 so that pulses that were negative in the bipolar shaped signal are positive in the inverted bipolar shaped signal. This allows a peak of a pulse that was originally negative in the bipolar shaped signal to be detected by the peak detector 484b, which preferably detects positive pulses. Upon detection of this peak the peak detector 484b can output a second trigger signal $T_{p2}$.

The first and second trigger signals $T_{p1}$ and $T_{p2}$ can be input to the TAC 486. The first trigger signal $T_{p1}$, can initiate a ramp signal in the TAC 468 and the second trigger signal $T_{p2}$ can stop the ramp signal in the TAC 486. Based on the duration between the first and second trigger signals $T_{p1}$, and $T_{p2}$, the TAC 486 can output a signal representing a drift time of the electrons to the anode from the point of interaction of an ionizing event, which can be used to determine a depth of interaction of the ionizing event.

The timing detector 480 measures the amplitude and peaking time of the cathode signal filtered by the bipolar shaping section 458 of the multi-stage timing shaper 452. Bipolar-shaped signals exhibit a unipolar response each time the slope of the charge amplified output voltage signal (i.e., the ramp) corresponding to the cathode signal changes. The amplitude of the resulting unipolar pulse is proportional to the change in slope, and the timing is related only to the time at which the slope changes. If the peaking time is small compared to the induction time, the shaped signal responds with a positive unipolar pulse when the ramp departs from a baseline (i.e., a first change in the slope), and with a negative unipolar pulse at the end of the ramp (i.e., a second change in the slope). The amplitude of the positive pulse is proportional to the slope, and it provides a first-order measurement of the energy of the ionizing event. The peaking time is associated with the time at which the slope changes, which provides, to a first order, a timing measurement independent of the energy and depth of interaction. For events with single point of interaction, the delay from the positive to the negative peak affords a first order value for the electron drift time (i.e., the depth of interaction). The readout unit 160 can measure the amplitude and timing of both positive and negative pulses.

Figure 7:
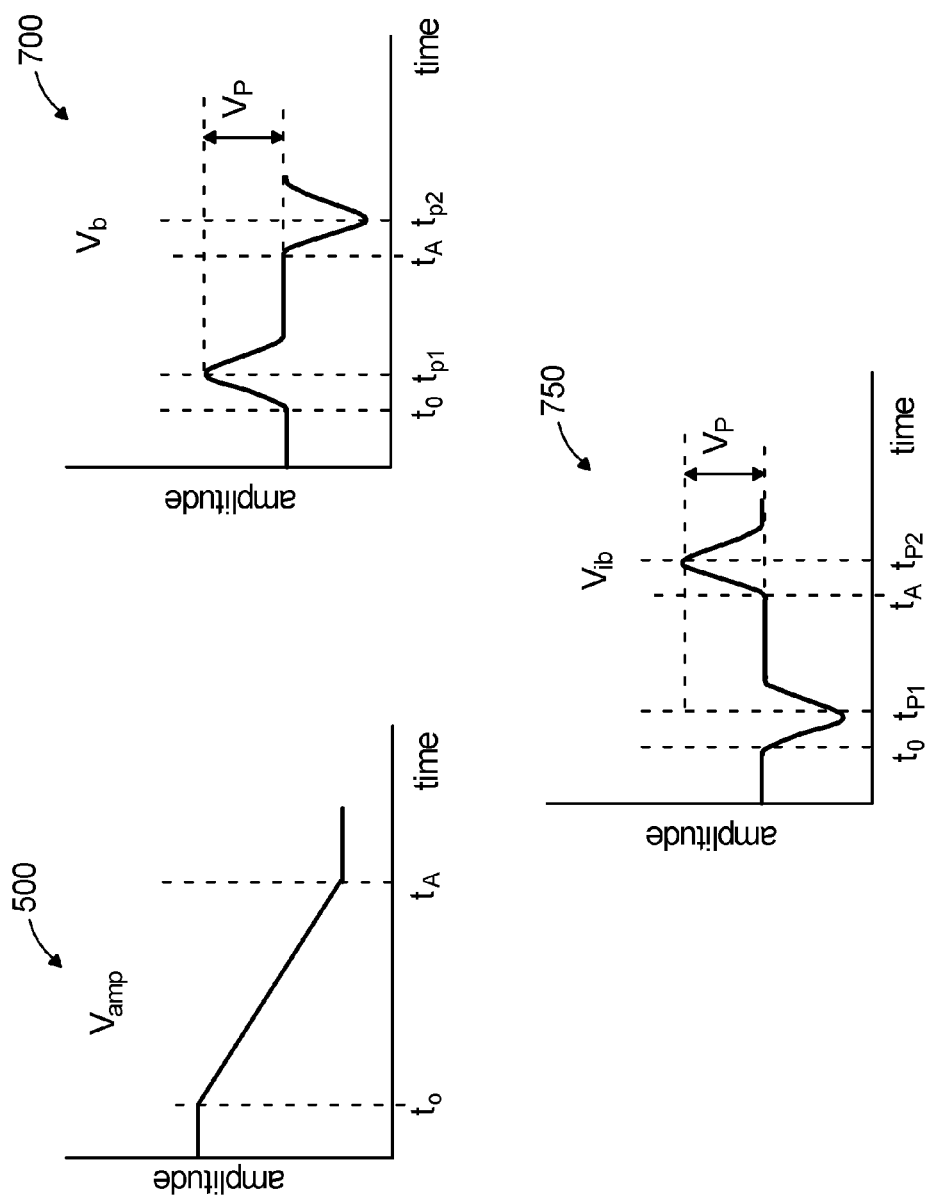

FIG. 7 is a graph showing the signals for the timing detector 480. The graph 500 again corresponds to the output of the charge amplifier 412, which represents the amplified cathode signal $V_{amp}$. Graph 700 represents the bipolar shaped cathode signal $V_b$ output from the bipolar shaping section 458 of the multi-stage timing shaper 452 and graph 750 represents the inverted bipolar shaped cathode signal $V_{ib}$ output from the bipolar shaping section 458 of the multi-stage timing shaper 452, which is simply an inverted version of the bipolar shaped cathode signal $V_b$. The signals $V_b$ and $V_{ib}$ can have two pulses, a positive pulse and a negative pulse. The amplitude $V_p$ of the pulses relative to the initial value of the signals $V_b$ and $V_{ib}$ can represent a peak amplitude of the signals $V_b$ and $V_{ib}$, which is proportional to the energy of the ionizing event. The positive pulse of graph 700 can begin at the time t0 when the ionizing event occurs and peak a time $t_{p1}$. The positive pulse of the graph 750 can begin at a time $t_A$, which corresponds to an end of the ionizing event, when the slope of the amplified cathode signal $V_{amp}$ changes. The positive pulse of graph 750 can peak at a time $t_{p2}$.

The preferred embodiments of the present invention can be based on the measurement of the peak amplitude and peaking time of the cathode signal filtered by the bipolar shaper section and the timing detector 480. The bipolar shaped cathode signal exhibits a unipolar response each time the charge amplifier signal $V_C$ (i.e. the ramp) changes slope. The amplitude $V_P$ of the resulting unipolar pulses is proportional to the slope. The timing $t_P$ is related to the time of change in the slope of the amplified cathode. If the shaping time is small compared to the electrons drift time, the shaped signal responds with a positive unipolar pulse at the ramp departure from the baseline (i.e. when an ionizing event occurs) and with a negative unipolar pulse at the end of the ramp (i.e. when the ionizing event is complete). The peaking time $t_P$ of the positive pulse provides a measurement of the time of interaction independent of the amplitude. The pulse amplitude $V_P$, proportional to the ramp slope, provides a measurement of the ionized charge. The delay from the positive to the negative peak $(t_{P2}-t_{P1})$ provides a measurement of the electrons drift time (i.e. the depth of interaction). As such, the preferred embodiments of the present invention facilitate measurement of a depth of interaction of an ionizing event without requiring the acquisition of multiple samples, thereby minimizing the switching and/or digital activity and a low signal-to-noise ratio due to the signal filtering.

By directly measuring the drift time and energy without requiring the information from the anodes, the first and the last methods of cathode timing are expected to offer better overall performance. All three were designed to provide a timing resolution better than 20 ns for charges above 1 fC.

Referring again to FIG. 4, the peak detectors 484a-b and the TACs 464, 474, and 486 can include memory 490 for storing information associated with the timing and amplitudes of the signal they receive. The TACs 464, 474, and 486 can also receive a stop signal, which corresponds to the enable EN signal, to stop processing performed in the TACs 464, 474, and 486, and which may act as a trigger signal in some embodiments.

Figure 8:
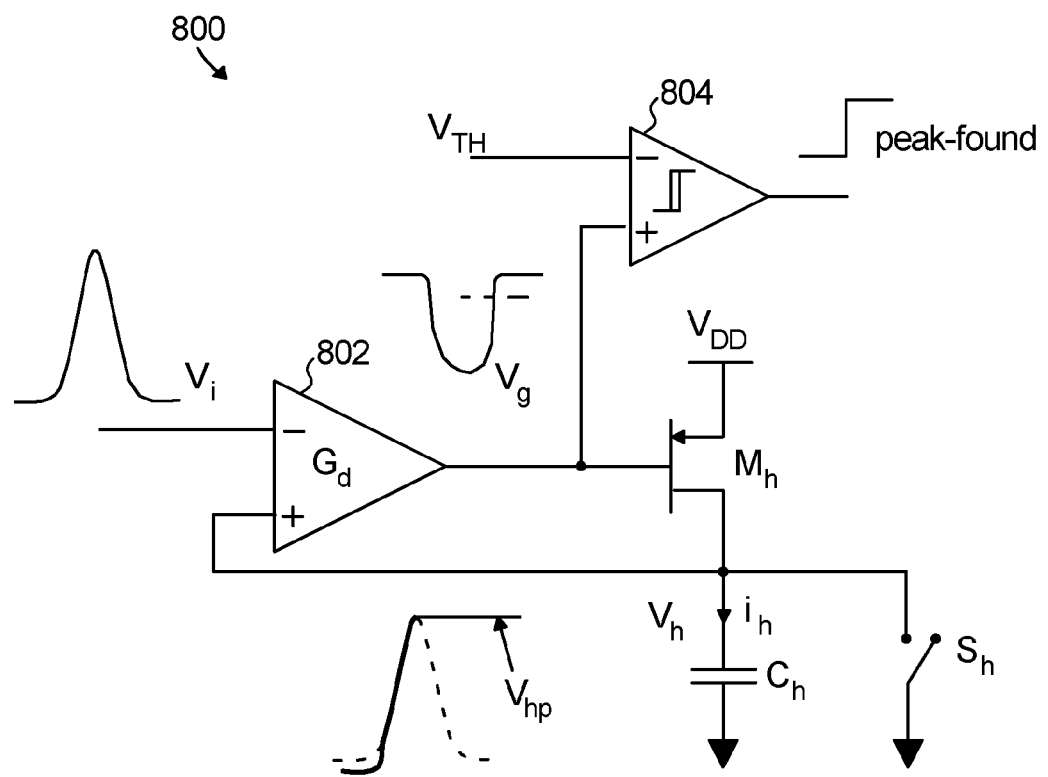
FIG. 8 is a block diagram of a peak detector that can be implemented in the readout unit of FIG. 2.

FIG. 8 is a block diagram of a preferred embodiment of a peak detector 800 that can be implemented for the peak detectors described with reference to FIGS. 3 and 4. The peak detector 800 can include a gain stage 802, a discriminator 804, a hold transistor $M_h$, a hold capacitor $C_h$, and a hold switch $S_h$. The gain stage 802 can receive an input $V_i$ corresponding to an input of the peak detector 800. An output $V_g$ of the gain stage 802 is coupled to an input of the discriminator 804 and the gate of the transistor $M_h$. The drain of the transistor is connected to a power supply VDD and the source of the transistor is coupled in feedback to the gain stage 802, the hold capacitor $C_h$, and the hold switch $S_h$. The discriminator 804 outputs a peak found signal, which can be output from the peak detector 800. The preferred embodiments of the present invention advantageously implement a peaking-time method that is to a first order, independent of the amplitude of a signal, where the timing of the peak-found signal of the peak detector 800 is substantially equal to one of the zero-crossings on a bipolar pulse.

The current flowing through the hold capacitor $C_h$ during peak detection equals the derivative of the input pulse according to $i_h = C_h dV_i/dt$, where $i_h$ represents the current flowing into the hold capacitor $C_h$. When the signal $V_i$ approaches its peak amplitude, the current $i_h$ approaches zero, and the voltage $V_g$ equals $V_{DD} - V_{THh}$, where $V_{THh}$ is the threshold voltage of the transistor $M_h$. Immediately after the peak, the signal $V_i$ starts falling and, due to a high gain $G_d$ of the gain stage 802, the output voltage $V_g$ of the gain stage 802 sharply increases towards $V_{DD}$ crossing the comparator threshold value $V_{TH}$, which is preferably set at a voltage $V_{DD} - V_{THh} < V_{TH} < V_{DD}$.

A timing resolution $\sigma_t$ achievable with this using the above described embodiment can be approximated with $$\sigma_t \approx \frac{\sigma_{ih}}{i'_h(\tau_{p0})} \approx \frac{i_{hp}}{Q} \frac{ENC_b(\tau_{pb})}{i'_h(\tau_{TH})} \approx \frac{ENC_b(\tau_p \eta_p)\tau_p \lambda_p}{Q \rho_p}, \qquad (1)$$

where $\sigma_{i_h}$ is the noise on the current signal $i_h$, and $i_h'$ are the derivatives calculated at a time $\tau_{TH}$ of the threshold crossing of the comparator, where $i_h(\tau_{TH})=i_{hTH}$ is the current. The value of $i_{hTH}$ is set by the threshold $V_{TH}$, and, for $\tau_{TH}$ approaching the time $\tau_{p0}$ at which $V_i$ peaks, it follows that $i_h'(\tau_{TH}) \approx i_h'(\tau_{p0})$. In equation (1), the noise $\sigma_{i_h}$ can be assumed to be dominated by noise on the shaped pulse $V_i$ and it is calculated in equation (1) as $ENC_h$ multiplied by the gain from charge Q to the current $i_h$ in $C_h$ (i.e., $i_{hp}/Q$, where $i_{hp}$ is the peak value of $i_h$). Therefore, the term $ENC_h$ is calculated assuming a bipolar shape (current $i_h$) with peaking time $\tau_{pb}$. Normalized coefficients can be adopted, yielding the final expression in equation (1) that depends only on Q and the peaking time $\tau_p$ of $V_i$. For a 5$^{th}$ order shaper with complex conjugate poles, the normalized coefficients are $\rho_p=3.65$, $\eta_p=0.58$, and $\lambda_p=1.58$.

The contribution of noise to the timing resolution is proportional to the square of the peaking time, and can be approximated with $\rho_{ih\_hf}/i_h'(\tau_{p0})$, where $\rho_{ih\_hf}$ is the corresponding rms current noise. A resistor can be placed in series with the capacitor $C_h$, to help stabilize the peak detector loop, and to filter part of such high-frequency noise. Noise from the comparator can be evaluated as $\rho_{vc}/\psi_{Vg}$, where $\rho_{vc}$ is the rms voltage noise at its input, and $\psi_{Vg}$ is the slope of $V_g$. The slope can be approximated from the Taylor series of the signal, $V_i - V_{ip}$, immediately after the peak, yielding $\psi_{Vg} \approx A \cdot \text{sqrt}(2i_h'(\tau_{p0})V_{ip}/C_h)$ where A is the difference voltage gain. The contribution of noise from the comparator is proportional to the square of the peaking time. When the timing signal (e.g., peak-found signal) is converted into a voltage using a TAC, such as TACs 380, 464, 474, and 486, the series noise from the TAC and its readout can be approximated with $\text{sqrt}(S_{iTAC} T_{TAC})/(\psi_{TAC} C_{TAC})$, where $S_{iTAC}$ is the spectral noise power density of the current flowing into a capacitor $C_{TAC}$ to generate the ramp in the TAC, $T_{TAC}$ is the ramp's duration, and $\psi_{TAC}$ is its slope. The contribution from stages occurring after the TAC can be approximated with $\rho_{vro}/\psi_{TAC}$ where $\rho_{vro}$ is their rms input voltage noise.

Figure 9:
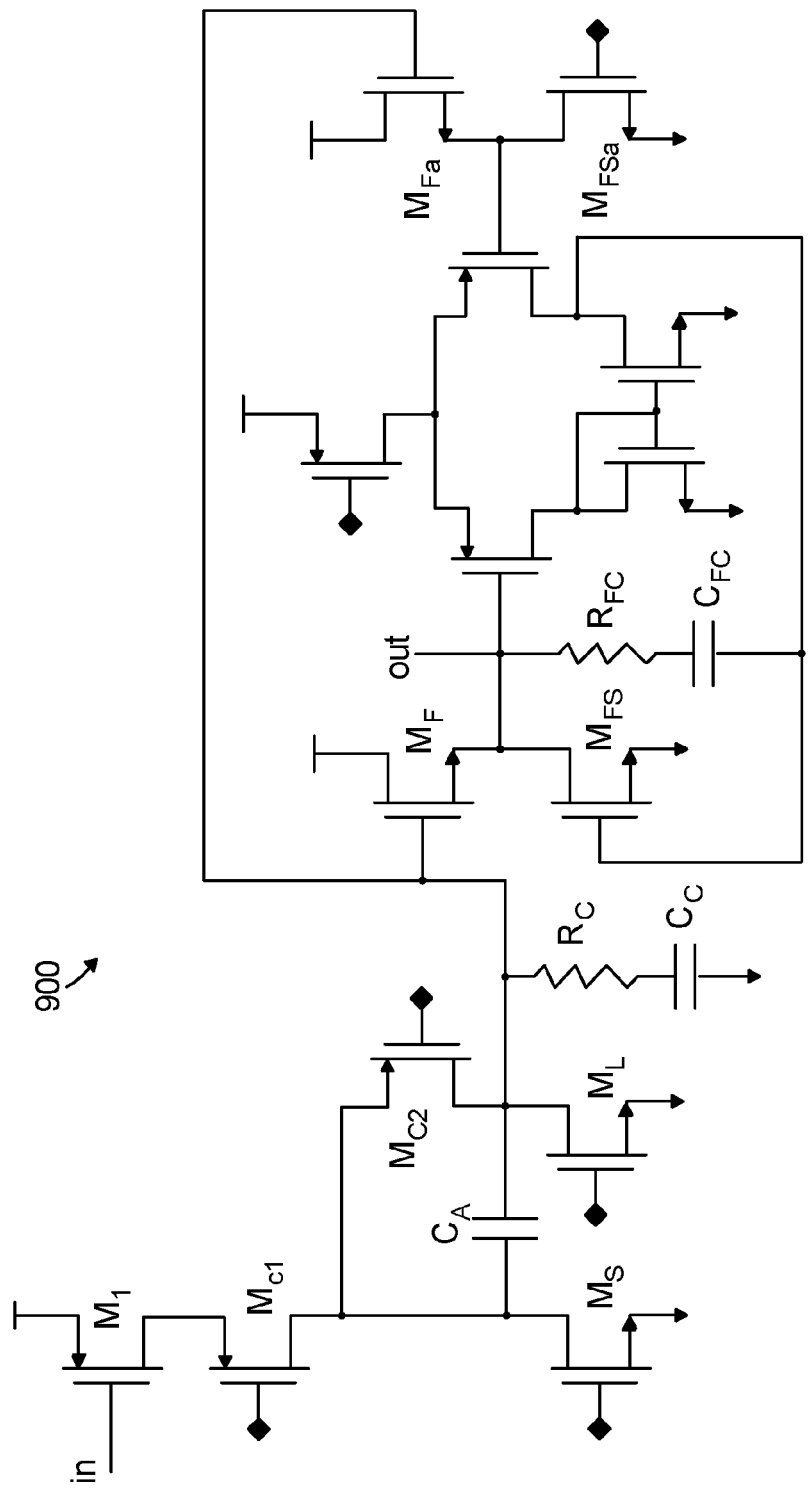
FIG. 9 is simplified schematic of a voltage amplifier that can be implemented in portions of the anode and cathode channels of FIG. 3 and FIG. 4.

FIG. 9 is a schematic of a voltage amplifier 900 that can be implemented in accordance with a preferred embodiment of the present invention. The voltage amplifier 900 can be implemented in the charge amplifiers and signal shapers described with reference to FIG. 3 and FIG. 4. The voltage amplifier 900 can be composed of transistor, preferably metal oxide semiconductor field effect transistors (MOSFETs), resistor, and capacitor elements. The elements of the voltage amplifier 900 can be implemented using any suitable technology. In one embodiment, the voltage amplifier 900 is implemented in a Complimentary Metal Oxide Semiconductor (CMOS) 0.25 micron fabrication technology, such as those available from Taiwan Semiconductor Manufacturing Company (TSMC). In other embodiments, other fabrication technologies can be implemented, such as CMOS 0.13 micron fabrication technology.

A transistor M1 is preferably a p-channel metal oxide semiconductor field effect transistor (MOSFET) device with gate size L/W of about 0.36 μm/300 μm and a drain current biased at about 100 μA, corresponding to about 250 μW dissipated in the input branch. With a transconductance $g_m$ of about 1.7 mS and a gate capacitance $C_g$ of about 650 fF. The input transistor M1 contributes to the Equivalent Noise Charge (ENC) with about 75 electrons rms at 3 pF input capacitance (assuming a high order shaper with 1 μs peaking time).

The input transistor $M_1$ is followed by a dual-cascode stage having a transistor $M_{C1}$ and a transistor $M_{C2}$, which increases the direct current (dc) gain of the charge amplifier 900 and lowers the impedance at the drain node of the transistor $M_1$, and thereby improves the performance of the voltage amplifier without increasing the power dissipation. The voltage drop across transistor $M_{C1}$, has negligible impact for embodiments of the voltage amplifier 900 that are based on a continuous reset. A preferred gate width of the transistor $M_{C1}$ is about one third of the transistor $M_1$.

In some embodiments, the voltage amplifier 900 may provide a negative swing at the output of the voltage amplifier 900. For these embodiments, the capacitor $C_A$ can operatively connect the source of the transistor $M_{C2}$ to the drain of the transistor $M_{C2}$. For negative output swings, the voltage at the drain node of the load transistor $M_L$ (gain node) is slew-rate limited by the current in the load transistor $M_L$. When this occurs, the input voltage of the voltage amplifier 900 increases suddenly, and the drain voltage of the current source transistor $M_S$ falls. The capacitor $C_A$ uses this decrease to send additional current to the load transistor $M_L$ (gain node), thereby improving the performance of the voltage amplifier 900 for large signals. A preferred value of the capacitor $C_A$ is about 1 pF.

The output stage of the voltage amplifier 900 can include a source follower formed by transistors $M_F$ and $M_{FS}$ that is assisted by a scaled-down replica of the source follower formed by transistors $M_{Fa}$ and $M_{FSa}$ and by a differential amplifier formed by transistors $M_{d1}$, $M_{d2}$, $M_{d3}$, $M_{d4}$, and $M_{d5}$ generating a local feedback. A dc gate voltage of the source transistor $M_{FS}$ is forced to the gate voltage of $M_{FSa}$. During transients, the gate voltage of the transistor $M_{FS}$ is dynamically adjusted, increasing or decreasing the drain current so that the loaded output voltage follows its unloaded replica. A fast negative signal applied to the gate of the transistors $M_F$ and $M_{Fa}$ produces a differential signal at the input of the differential amplifier. As a consequence, the gate of transistor $M_{FS}$, which is connected to the output out of the differential stage, moves in the positive direction. In this way the current in the transistor $M_{FS}$ is dynamically increased and is not limited by the dc bias value. This increased current allows a faster discharging of the output node with respect to that of a traditional source follower without local feedback.

The voltage amplifier 900 also works for positive input signals. In this case, the transistor $M_{FS}$ starts to be switched off by the negative output out of the differential stage. In this way, a larger fraction of the current flowing in the transistor $M_F$ is sent to the output. The time constants of the output node and unloaded replica are set through their current and scaling factor. In one embodiment, currents through the transistor $M_{FS}$, transistor $M_{FSa}$, and the transistors of the differential stage are about 20 μA, 1 μA, and 4 μA, respectively. A preferred source follower scaling factor is about 20. An RC network formed by resistor $R_{FC}$ and capacitor $C_{FC}$, with preferred values of about 10 kΩ and about 100 fF, respectively, provides compensation and bypasses the active loop at the highest frequencies.

For the charge amplifier 412 of the cathode channel 220, the input MOSFET $M_1$ is preferably a p-channel device optimized for 6 pF input capacitance, with gate size L/W=0.36 μm/600 μm and biased at a drain current of about 200 μA, corresponding to 500 μW dissipated in the input branch. With a $g_m$ transconductance of about 3.4 mS and a gate capacitance $C_g$ of about 1.3 pF, it contributes to the ENC with about 100 electrons rms at 6 pF input capacitance (assuming a high order shaper with 1 μs peaking time).

While preferred embodiments of the present invention have been described herein, it is expressly noted that the present invention is not limited to these embodiments, but rather the intention is that additions and modifications to what is expressly described herein are also included within the scope of the invention. Moreover, it is to be understood that the features of the various embodiments described herein are not mutually exclusive and can exist in various combinations and permutations, even if such combinations or permutations are not made explicit herein, without departing from the spirit and scope of the invention.

The invention claimed is:

1. A device for measuring an ionizing event in a radiation sensor comprising:
   a charge amplifier for receiving a cathode signal, said charge amplifier configured to output an amplified cathode signal; and
   a timing shaper operatively connected to said charge amplifier to receive said amplified cathode signal, said timing shaper configured to generate a first pulse in response to a beginning of said ionizing event and a second pulse in response to an end of said ionizing event, said first and second pulses being associated with a depth of interaction of said ionizing event, said first and second pulses being generated in response to a slope of said amplified cathode signal changing.

2. The device defined by claim 1 further comprising a first timing detector operatively connected to said timing shaper and configured to receive said first and second pulses, said timing detector determining an amount of time between said first and second pulses.

3. The device defined by claim 2, wherein said first timing detector comprises:
   a first peak detector to determine a first peak amplitude of said first pulse; and
   a second peak detector to determine a second peak amplitude of said second pulse.

4. The device defined by claim 3, wherein said timing detector comprises a discriminator to selectively pass at least a portion of said first pulse to said first peak detector based on a comparison of said first pulse with a threshold value.

5. The device defined by claim 4, wherein said timing detector comprises a time-amplitude converter (TAC) to determine said amount of time between said first and second pulses, said TAC receiving a first trigger signal from said first peak detector and a second trigger signal from said second peak detector.

6. The device defined by claim 5, wherein said TAC determines said amount of time between said first and second pulses by subtracting a first time at which said first peak amplitude occurs from a second time at which said second peak amplitude occurs.

7. The device defined by claim 1, wherein a peak amplitude of at least one of said first pulse and said second pulse is substantially proportional to a slope of said cathode signal.

8. The device defined by claim 1 further comprising a second timing detector operatively connected to said timing shaper and configured to receive said cathode signal without modification by said timing shaper.

9. The device defined by claim 8, wherein said second timing detector comprises:
   a plurality of discriminators for receiving said cathode signal, said plurality of discriminators being associated with different threshold values, said plurality of discriminators determining whether to output at least a portion of said cathode signal based on a comparison of said cathode signal and said different threshold levels; and
   a TAC configured to receive outputs from said discriminators, said TAC using said outputs to determine a slope of said cathode signal.

10. A method of detecting a depth of interaction in a radiation sensor comprising:
    generating a bipolar shaped cathode signal based on a cathode signal, said bipolar shaped signal having a first pulse corresponding to a first change in slope of said cathode signal and a second pulse corresponding to a second change in slope of said cathode signal; and
    determining an amount of time between a peak of said first pulse and a peak of said second pulse, said amount of time being related to said depth of interaction.

11. The method defined by claim 10, further comprising generating an inverted bipolar shaped cathode signal to invert said first and second pulses, said inverted bipolar shaped cathode signal being used to determine said peak of said second pulse.

12. The method defined by claim 10, wherein determining an amount of time between a peak of said first pulse and a peak of said second pulse comprises subtracting a first time at which said first peak amplitude occurs from a second time at which said second peak amplitude occurs.

13. The method defined by claim 10, further comprising:
    identifying said peak of said first pulse using a peak detector configured to detect a peak in response to said peak detector receiving a discriminated signal.

14. A radiation sensor comprising:
    a detector medium;
    a cathode disposed at a first end of said detector medium;
    at least one anode disposed at an opposing end of said detector medium; and
    a readout unit operatively connected to said cathode and said at least one anode, said readout unit configured to receive a cathode signal from said cathode in response to an ionizing event and generate a bipolar shaped cathode signal based on said cathode signal, said bipolar shaped signal having a first pulse corresponding to a first change in slope of said cathode signal and a second pulse corresponding to a second change in slope of said cathode signal, said readout unit being configured to determine an amount of time between a peak of said first pulse and a peak of said second pulse, said amount of time representing a depth of interaction of said ionizing event.

15. The radiation sensor defined by claim 14, wherein said readout unit comprises:
    a charge amplifier to receive said cathode signal, said charge amplifier configured to output an amplified cathode signal; and
    a timing shaper operatively connected to said charge amplifier to receive said amplified cathode signal, said timing shaper configured to generate a first pulse in response to a beginning of said ionizing event and a second pulse in response to an end of said ionizing event, said first and second pulses being associated with a depth of interaction of said ionizing event, said first and second pulses being generated in response to a slope of said amplified cathode signal changing.

16. The radiation sensor defined by claim 15, wherein said readout unit includes a first timing detector operatively connected to said timing shaper and configured to receive said first and second pulses, said timing detector determining an amount of time between said first and second pulses.

17. The device defined by claim 16, wherein said first timing detector comprises:

a first peak detector to determine a first peak amplitude of said first pulse; and a second peak detector to determine a second peak amplitude of said second pulse.

18. The device defined by claim 17, wherein said timing detector comprises a discriminator to selectively pass at least a portion of said first pulse to said first peak detector based on a comparison of said first pulse with a threshold value.

19. The device defined by claim 17, wherein said first timing detector comprises a time-amplitude converter (TAC) to determine said amount of time between said first and second pulses, said TAC receiving a first trigger signal from said first peak detector and a second trigger signal from said second peak detector.

20. The device defined by claim 18, wherein said TAC determines said amount of time between said first and second pulses by subtracting a first time at which said first peak amplitude occurs from a second time at which said second peak amplitude occurs.

* * * * *

UNITED STATES PATENT AND TRADEMARK OFFICE
CERTIFICATE OF CORRECTION

| | |
|---|---|
| PATENT NO. | : 8,269,180 B2 |
| APPLICATION NO. | : 12/199524 |
| DATED | : September 18, 2012 |
| INVENTOR(S) | : De Geronimo et al. |

It is certified that error appears in the above-identified patent and that said Letters Patent is hereby corrected as shown below:

On The Title Page, Item (75) Inventor should read –
Gianluigi De Geronimo, Syosset, NY (US)
Angelo Dragon, LaHonda, CA (US)

Signed and Sealed this
Eighteenth Day of August, 2015

Michelle K. Lee
*Director of the United States Patent and Trademark Office*

UNITED STATES PATENT AND TRADEMARK OFFICE
CERTIFICATE OF CORRECTION

PATENT NO. : 8,269,180 B2
APPLICATION NO. : 12/199524
DATED : September 18, 2012
INVENTOR(S) : De Geronimo et al.

Page 1 of 1

It is certified that error appears in the above-identified patent and that said Letters Patent is hereby corrected as shown below:

On The Title Page, Item (12) "De Geronimo" should read – De Geronimo et al.

On The Title Page, Item (75) Inventor should read –
Gianluigi De Geronimo, Syosset, NY (US)
Angelo Dragon, LaHonda, CA (US)

This certificate supersedes the Certificate of Correction issued August 18, 2015.

Signed and Sealed this
Tenth Day of November, 2015

Michelle K. Lee
*Director of the United States Patent and Trademark Office*